United States Patent
Subramaniyam et al.

(10) Patent No.: US 11,483,175 B2
(45) Date of Patent: Oct. 25, 2022

(54) VIRTUAL DISTRIBUTED BRIDGING

(71) Applicant: Nicira, Inc., Palo Alto, CA (US)

(72) Inventors: Rahul Korivi Subramaniyam, Sunnyvale, CA (US); Howard Wang, Cupertino, CA (US); Ganesan Chandrashekhar, Campbell, CA (US); Vivek Agarwal, Campbell, CA (US); Ram Dular Singh, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 117 days.

(21) Appl. No.: 16/671,225

(22) Filed: Nov. 1, 2019

(65) Prior Publication Data

US 2020/0067730 A1     Feb. 27, 2020

Related U.S. Application Data

(62) Division of application No. 14/503,168, filed on Sep. 30, 2014, now Pat. No. 10,511,458.

(51) Int. Cl.
*H04L 12/46* (2006.01)

(52) U.S. Cl.
CPC ...... *H04L 12/4625* (2013.01); *H04L 12/4633* (2013.01); *H04L 12/4641* (2013.01); *H04L 2012/4629* (2013.01)

(58) Field of Classification Search
None
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,751,967 A | 5/1998 | Raab et al. |

(Continued)

FOREIGN PATENT DOCUMENTS

| | | |
|---|---|---|
| CN | 1929397 A | 3/2007 |
| CN | 101232339 A | 7/2008 |

(Continued)

OTHER PUBLICATIONS

Non-Published Commonly Owned U.S. Appl. No. 17/341,317, filed Jun. 7, 2021, 112 pages, Nicira, Inc.

(Continued)

*Primary Examiner* — Mariela Vidal Carpio
(74) *Attorney, Agent, or Firm* — Adeli LLP

(57) ABSTRACT

Virtualization software that includes a VDRB (virtual distributed router/bridge) module for performing L3 routing and/or bridging operations is provided. At least some of the VDRBs are configured as VDBs (virtual distributed bridge) for performing bridging operations between different network segments in a distributed manner. The bridging tasks of a network are partitioned among several VDBs of the network based on MAC addresses. MAC addresses of VMs or other types of network nodes belonging to an overlay logical network are partitioned into several shards, each shard of MAC addresses assigned to a VDB in the network. Each VDB assigned a shard of MAC addresses performs bridging when it receives a packet bearing a MAC address belonging to its assigned shard. A VDB does not perform bridging on packets that do not have MAC address that falls within the VDB's shard of MAC addresses.

19 Claims, 24 Drawing Sheets

(56) References Cited

U.S. PATENT DOCUMENTS

| | | | |
|---|---|---|---|
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,493,767 B1 | 12/2002 | Ishida et al. |
| 6,512,745 B1 | 1/2003 | Abe et al. |
| 6,539,432 B1 | 3/2003 | Taguchi et al. |
| 6,631,137 B1 | 10/2003 | Lorrain et al. |
| 6,640,251 B1 | 10/2003 | Wiget et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,215,637 B1 | 5/2007 | Ferguson et al. |
| 7,260,648 B2 | 8/2007 | Tingley et al. |
| 7,283,473 B2 | 10/2007 | Arndt et al. |
| 7,339,929 B2 | 3/2008 | Zelig et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,555,002 B2 | 6/2009 | Arndt et al. |
| 7,590,114 B1 * | 9/2009 | Bishara .................. H04L 12/18 |
| | | 370/390 |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,265,075 B2 | 9/2012 | Pandey |
| 8,281,067 B2 | 10/2012 | Stolowitz |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,341,626 B2 | 12/2012 | Gardner et al. |
| 8,351,418 B2 | 1/2013 | Zhao et al. |
| 8,369,345 B1 | 2/2013 | Raghunathan et al. |
| 8,370,834 B2 | 2/2013 | Edwards et al. |
| 8,401,024 B2 | 3/2013 | Christensen et al. |
| 8,456,984 B2 | 6/2013 | Ranganathan et al. |
| 8,504,718 B2 | 8/2013 | Wang et al. |
| 8,560,646 B1 | 10/2013 | Sivasubramanian et al. |
| 8,565,108 B1 | 10/2013 | Marshall et al. |
| 8,611,351 B2 | 12/2013 | Gooch et al. |
| 8,611,352 B2 | 12/2013 | Mizrahi et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,761,152 B2 * | 6/2014 | Rixner .................. H04L 61/103 |
| | | 370/351 |
| 8,837,281 B2 | 9/2014 | Sultan et al. |
| 8,848,508 B2 | 9/2014 | Moreno et al. |
| 8,856,518 B2 | 10/2014 | Sridharan et al. |
| 8,892,706 B1 * | 11/2014 | Dalal .................... H04L 49/70 |
| | | 709/223 |
| 8,923,155 B2 | 12/2014 | Qu et al. |
| 8,958,298 B2 | 2/2015 | Zhang et al. |
| 8,989,183 B2 | 3/2015 | Bansal et al. |
| 9,008,097 B2 | 4/2015 | Bloch et al. |
| 9,059,999 B2 | 6/2015 | Koponen et al. |
| 9,137,052 B2 | 9/2015 | Koponen et al. |
| 9,225,636 B2 | 12/2015 | Krishnan et al. |
| 9,246,821 B1 | 1/2016 | Li et al. |
| 9,306,837 B1 | 4/2016 | Jain et al. |
| 9,407,450 B2 | 8/2016 | Singh |
| 9,413,644 B2 | 8/2016 | Agarwal et al. |
| 9,448,821 B2 | 9/2016 | Wang |
| 9,575,782 B2 | 2/2017 | Chandrashekhar et al. |
| 9,621,508 B2 * | 4/2017 | Duda .................... H04L 12/4641 |
| 9,628,294 B1 * | 4/2017 | Brandwine ........... H04L 69/167 |
| 9,686,180 B2 * | 6/2017 | Chu ...................... H04L 45/021 |
| 9,768,980 B2 | 9/2017 | Subramaniyam et al. |
| 9,785,455 B2 | 10/2017 | Chandrashekhar et al. |
| 9,893,988 B2 | 2/2018 | Agarwal et al. |
| 9,910,686 B2 | 3/2018 | Chandrashekhar et al. |
| 9,977,685 B2 | 5/2018 | Chandrashekhar et al. |
| 10,020,960 B2 | 7/2018 | Wang et al. |
| 10,225,184 B2 | 3/2019 | Agarwal et al. |
| 10,250,443 B2 | 4/2019 | Chandrashekhar et al. |
| 10,348,625 B2 | 7/2019 | Agarwal et al. |
| 10,361,952 B2 | 7/2019 | Agarwal et al. |
| 10,374,827 B2 | 8/2019 | Wang et al. |
| 10,511,458 B2 | 12/2019 | Subramaniyam et al. |
| 10,511,459 B2 | 12/2019 | Sharma et al. |
| 10,528,373 B2 | 1/2020 | Chandrashekhar et al. |
| 10,587,514 B1 | 3/2020 | Singh et al. |
| 10,693,783 B2 | 6/2020 | Agarwal et al. |
| 11,029,982 B2 | 6/2021 | Chandrashekhar et al. |
| 11,050,666 B2 | 6/2021 | Agarwal et al. |
| 11,190,443 B2 | 11/2021 | Agarwal et al. |
| 11,252,037 B2 | 2/2022 | Chandrashekhar et al. |
| 2001/0043614 A1 | 11/2001 | Viswanadham et al. |
| 2002/0013858 A1 | 1/2002 | Anderson |
| 2002/0093952 A1 | 7/2002 | Gonda |
| 2002/0194369 A1 | 12/2002 | Rawlins et al. |
| 2003/0026258 A1 | 2/2003 | Takatani et al. |
| 2003/0026271 A1 | 2/2003 | Erb et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2004/0054799 A1 | 3/2004 | Meier et al. |
| 2004/0073659 A1 | 4/2004 | Rajsic et al. |
| 2004/0098505 A1 | 5/2004 | Clemmensen |
| 2004/0260834 A1 | 12/2004 | Lindholm et al. |
| 2004/0267866 A1 | 12/2004 | Carollo et al. |
| 2005/0018669 A1 | 1/2005 | Arndt et al. |
| 2005/0025179 A1 | 2/2005 | McLaggan et al. |
| 2005/0027881 A1 | 2/2005 | Figueira et al. |
| 2005/0053079 A1 | 3/2005 | Havala |
| 2005/0083953 A1 | 4/2005 | May |

(56) References Cited

U.S. PATENT DOCUMENTS

| | | |
|---|---|---|
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0008981 A1 | 1/2007 | Pathan |
| 2007/0043860 A1 | 2/2007 | Pabari |
| 2007/0061492 A1 | 3/2007 | Riel |
| 2007/0064673 A1 | 3/2007 | Bhandaru et al. |
| 2007/0097948 A1 | 5/2007 | Boyd et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0201490 A1 | 8/2007 | Mahamuni |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0008148 A1 | 1/2008 | Sagawa |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0069107 A1* | 3/2008 | Sofia ............ H04L 45/04 370/392 |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0181243 A1 | 7/2008 | Vobbilisetty et al. |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2008/0298274 A1 | 12/2008 | Takashige et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092043 A1 | 4/2009 | Lapuh et al. |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0144403 A1 | 6/2009 | Sajassi et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0287848 A1 | 11/2009 | Kamura et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0020726 A1 | 1/2010 | Chu et al. |
| 2010/0046531 A1 | 2/2010 | Louati et al. |
| 2010/0107162 A1 | 4/2010 | Edwards et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0208615 A1* | 8/2010 | Soon ............ H04L 12/462 370/254 |
| 2010/0214949 A1 | 8/2010 | Smith et al. |
| 2010/0246443 A1 | 9/2010 | Cohn et al. |
| 2010/0257263 A1 | 10/2010 | Casado et al. |
| 2010/0275199 A1 | 10/2010 | Smith et al. |
| 2010/0287548 A1 | 11/2010 | Zhou et al. |
| 2010/0290485 A1 | 11/2010 | Martini et al. |
| 2011/0016215 A1 | 1/2011 | Wang |
| 2011/0022695 A1 | 1/2011 | Dalal et al. |
| 2011/0032830 A1 | 2/2011 | Merwe et al. |
| 2011/0035494 A1 | 2/2011 | Pandey et al. |
| 2011/0075664 A1 | 3/2011 | Lambeth et al. |
| 2011/0075667 A1 | 3/2011 | Li et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0202920 A1 | 8/2011 | Takase |
| 2011/0205931 A1 | 8/2011 | Zhou et al. |
| 2011/0225207 A1 | 9/2011 | Subramanian et al. |
| 2011/0261825 A1 | 10/2011 | Ichino |
| 2011/0264610 A1 | 10/2011 | Armstrong et al. |
| 2011/0283017 A1 | 11/2011 | Alkhatib et al. |
| 2011/0292939 A1 | 12/2011 | Subramaian et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317703 A1 | 12/2011 | Dunbar et al. |
| 2011/0320577 A1 | 12/2011 | Bhat et al. |
| 2012/0008528 A1 | 1/2012 | Dunbar et al. |
| 2012/0014386 A1 | 1/2012 | Xiong et al. |
| 2012/0014387 A1 | 1/2012 | Dunbar et al. |
| 2012/0017022 A1 | 1/2012 | Corrigan et al. |
| 2012/0079478 A1 | 3/2012 | Galles et al. |
| 2012/0131643 A1 | 5/2012 | Cheriton |
| 2012/0158997 A1 | 6/2012 | Hsu et al. |
| 2012/0182992 A1 | 7/2012 | Cowart et al. |
| 2012/0189009 A1 | 7/2012 | Shekhar et al. |
| 2012/0236734 A1 | 9/2012 | Sampath et al. |
| 2012/0291024 A1 | 11/2012 | Barabash et al. |
| 2012/0307826 A1 | 12/2012 | Matsuoka |
| 2012/0323987 A1 | 12/2012 | Cantu et al. |
| 2013/0007740 A1 | 1/2013 | Kikuchi et al. |
| 2013/0010600 A1 | 1/2013 | Jocha et al. |
| 2013/0016723 A1 | 1/2013 | Arad et al. |
| 2013/0031233 A1 | 1/2013 | Feng et al. |
| 2013/0034094 A1 | 2/2013 | Cardona et al. |
| 2013/0044629 A1 | 2/2013 | Biswas et al. |
| 2013/0044636 A1 | 2/2013 | Koponen et al. |
| 2013/0044641 A1 | 2/2013 | Koponen et al. |
| 2013/0044751 A1 | 2/2013 | Casado et al. |
| 2013/0054761 A1 | 2/2013 | Kempf et al. |
| 2013/0058346 A1 | 3/2013 | Sridharan et al. |
| 2013/0061047 A1 | 3/2013 | Sridharan et al. |
| 2013/0073743 A1 | 3/2013 | Ramasamy et al. |
| 2013/0097345 A1 | 4/2013 | Munoz et al. |
| 2013/0103817 A1 | 4/2013 | Koponen et al. |
| 2013/0121209 A1 | 5/2013 | Padmanabhan et al. |
| 2013/0124750 A1 | 5/2013 | Anumala et al. |
| 2013/0125112 A1 | 5/2013 | Mittal et al. |
| 2013/0136126 A1 | 5/2013 | Wang et al. |
| 2013/0142048 A1 | 6/2013 | Gross, IV et al. |
| 2013/0145002 A1 | 6/2013 | Kannan et al. |
| 2013/0145008 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0151685 A1 | 6/2013 | Bursell |
| 2013/0170490 A1 | 7/2013 | Kreeger et al. |
| 2013/0182574 A1 | 7/2013 | So et al. |
| 2013/0227550 A1 | 8/2013 | Weinstein et al. |

(56) References Cited

U.S. PATENT DOCUMENTS

| | | |
|---|---|---|
| 2013/0227566 A1 | 8/2013 | Higuchi et al. |
| 2013/0266015 A1 | 10/2013 | Qu et al. |
| 2013/0266019 A1 | 10/2013 | Qu et al. |
| 2013/0268588 A1 | 10/2013 | Chang et al. |
| 2013/0297768 A1 | 11/2013 | Singh |
| 2013/0301553 A1* | 11/2013 | Klein ................... H04W 76/12 370/329 |
| 2013/0318219 A1 | 11/2013 | Kancherla |
| 2013/0322453 A1 | 12/2013 | Allan |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0332983 A1 | 12/2013 | Koorevaar et al. |
| 2013/0339544 A1 | 12/2013 | Mithyantha |
| 2014/0006585 A1 | 1/2014 | Dunbar et al. |
| 2014/0019639 A1 | 1/2014 | Ueno |
| 2014/0025779 A1 | 1/2014 | Matsumoto |
| 2014/0036730 A1 | 2/2014 | Nellikar et al. |
| 2014/0036924 A1 | 2/2014 | Christenson |
| 2014/0050091 A1 | 2/2014 | Biswas et al. |
| 2014/0056298 A1 | 2/2014 | Vobbilisetty et al. |
| 2014/0064276 A1* | 3/2014 | Basso ................. H04L 45/7453 370/392 |
| 2014/0068602 A1 | 3/2014 | Gember et al. |
| 2014/0092901 A1 | 4/2014 | Kapadia et al. |
| 2014/0092907 A1 | 4/2014 | Sridhar et al. |
| 2014/0112343 A1 | 4/2014 | Lambeth et al. |
| 2014/0115578 A1 | 4/2014 | Cooper et al. |
| 2014/0115584 A1 | 4/2014 | Mudigonda et al. |
| 2014/0123211 A1 | 5/2014 | Wanser et al. |
| 2014/0140244 A1 | 5/2014 | Kapadia et al. |
| 2014/0146817 A1 | 5/2014 | Zhang |
| 2014/0169169 A1 | 6/2014 | Almog et al. |
| 2014/0169215 A1* | 6/2014 | Rajendran ............... H04L 49/70 370/254 |
| 2014/0169222 A1* | 6/2014 | Cohen ................... H04L 12/462 370/255 |
| 2014/0195666 A1 | 7/2014 | Dumitriu et al. |
| 2014/0201733 A1 | 7/2014 | Benny et al. |
| 2014/0207930 A1 | 7/2014 | Benny |
| 2014/0233567 A1* | 8/2014 | Guo ......................... H04L 45/60 370/392 |
| 2014/0241247 A1 | 8/2014 | Kempf et al. |
| 2014/0269705 A1 | 9/2014 | DeCusatis et al. |
| 2014/0269709 A1 | 9/2014 | Benny et al. |
| 2014/0280738 A1 | 9/2014 | Kolker et al. |
| 2014/0282889 A1 | 9/2014 | Ishaya et al. |
| 2014/0294005 A1 | 10/2014 | Jain et al. |
| 2014/0328343 A1 | 11/2014 | Kapadia et al. |
| 2014/0334485 A1 | 11/2014 | Jain et al. |
| 2014/0337497 A1 | 11/2014 | Wanser et al. |
| 2014/0337500 A1 | 11/2014 | Lee |
| 2014/0348166 A1 | 11/2014 | Yang et al. |
| 2015/0010001 A1 | 1/2015 | Duda et al. |
| 2015/0043576 A1 | 2/2015 | Dixon et al. |
| 2015/0043581 A1 | 2/2015 | Devireddy et al. |
| 2015/0058470 A1 | 2/2015 | Duda |
| 2015/0058968 A1 | 2/2015 | Wang et al. |
| 2015/0063353 A1* | 3/2015 | Kapadia ................. H04L 45/745 370/392 |
| 2015/0063364 A1 | 3/2015 | Thakkar et al. |
| 2015/0082418 A1 | 3/2015 | Gu |
| 2015/0100681 A1 | 4/2015 | Reese et al. |
| 2015/0103661 A1 | 4/2015 | Shen et al. |
| 2015/0103679 A1 | 4/2015 | Tessmer et al. |
| 2015/0103838 A1 | 4/2015 | Zhang et al. |
| 2015/0103839 A1 | 4/2015 | Chandrashekhar et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0109923 A1 | 4/2015 | Hwang |
| 2015/0117454 A1 | 4/2015 | Koponen et al. |
| 2015/0124612 A1 | 5/2015 | Schlansker et al. |
| 2015/0124817 A1* | 5/2015 | Merchant ............. H04L 61/103 370/392 |
| 2015/0124821 A1* | 5/2015 | Chu .................... H04L 12/4633 370/392 |
| 2015/0124826 A1 | 5/2015 | Edsall et al. |
| 2015/0200954 A1 | 7/2015 | Gourlay et al. |
| 2015/0281042 A1 | 10/2015 | Agarwal et al. |
| 2015/0281048 A1 | 10/2015 | Agarwal et al. |
| 2015/0319009 A1 | 11/2015 | Zhao |
| 2015/0334011 A1 | 11/2015 | Zheng et al. |
| 2015/0372943 A1 | 12/2015 | Hasan et al. |
| 2015/0381641 A1 | 12/2015 | Cabrera et al. |
| 2016/0021032 A1 | 1/2016 | Maier et al. |
| 2016/0057014 A1 | 2/2016 | Thakkar et al. |
| 2016/0094364 A1 | 3/2016 | Subramaniyam et al. |
| 2016/0094365 A1 | 3/2016 | Subramaniyam et al. |
| 2016/0094366 A1 | 3/2016 | Wang et al. |
| 2016/0094396 A1 | 3/2016 | Chandrashekhar et al. |
| 2016/0218925 A1 | 7/2016 | Mammen et al. |
| 2016/0226822 A1 | 8/2016 | Zhang et al. |
| 2016/0330045 A1* | 11/2016 | Tang ................... H04L 12/4633 |
| 2017/0005918 A1 | 1/2017 | Agarwal et al. |
| 2017/0005924 A1 | 1/2017 | Agarwal et al. |
| 2017/0005942 A1 | 1/2017 | Agarwal et al. |
| 2017/0141962 A1 | 5/2017 | Britt et al. |
| 2017/0286158 A1* | 10/2017 | Dai ..................... H04L 67/2814 |
| 2018/0167316 A1 | 6/2018 | Agarwal et al. |
| 2018/0276013 A1 | 9/2018 | Chandrashekhar et al. |
| 2019/0149357 A1 | 5/2019 | Wang et al. |
| 2019/0149358 A1 | 5/2019 | Sharma et al. |
| 2019/0207817 A1 | 7/2019 | Chandrashekhar et al. |
| 2019/0280972 A1 | 9/2019 | Agarwal et al. |
| 2020/0067732 A1 | 2/2020 | Sharma et al. |
| 2020/0081728 A1 | 3/2020 | Chandrashekhar et al. |
| 2020/0296038 A1 | 9/2020 | Agarwal et al. |
| 2021/0294622 A1 | 9/2021 | Chandrashekhar et al. |
| 2021/0328921 A1 | 10/2021 | Agarwal et al. |
| 2022/0078110 A1 | 3/2022 | Agarwal et al. |

FOREIGN PATENT DOCUMENTS

| | | |
|---|---|---|
| CN | 101808030 A | 8/2010 |
| CN | 101816168 A | 8/2010 |
| CN | 101822006 A | 9/2010 |
| CN | 101953120 A | 1/2011 |
| CN | 102334111 A | 1/2012 |
| CN | 102347898 A | 2/2012 |
| CN | 102549983 A | 7/2012 |
| CN | 102571998 A | 7/2012 |
| CN | 102577255 A | 7/2012 |
| CN | 102780601 A | 11/2012 |
| CN | 102801715 A | 11/2012 |
| CN | 103141058 A | 6/2013 |
| CN | 103379010 A | 10/2013 |
| CN | 103428063 A | 12/2013 |
| CN | 103491006 A | 1/2014 |
| CN | 103595648 A | 2/2014 |
| CN | 103890751 A | 6/2014 |
| CN | 103905283 A | 7/2014 |
| CN | 103930882 A | 7/2014 |
| CN | 103957160 A | 7/2014 |
| CN | 104025508 A | 9/2014 |
| CN | 104272668 A | 1/2015 |
| EP | 1653688 A1 | 5/2006 |
| EP | 2566129 A1 | 3/2013 |
| EP | 2648370 A1 | 10/2013 |
| EP | 3202098 A1 | 8/2017 |
| EP | 2736191 B1 | 8/2019 |
| JP | 2003069609 A | 3/2003 |
| JP | 2003124976 A | 4/2003 |
| JP | 2003318949 A | 11/2003 |
| JP | 2011171874 A | 9/2011 |
| JP | 2012231382 A | 11/2012 |
| JP | 2013175075 A | 9/2013 |
| JP | 2014230217 A | 12/2014 |
| KR | 20070050864 A | 5/2007 |
| WO | 2005094008 A1 | 10/2005 |
| WO | 2005112390 A1 | 11/2005 |
| WO | 2008095010 A1 | 8/2008 |

(56) References Cited

FOREIGN PATENT DOCUMENTS

| WO | 2009045130 A1 | 4/2009 |
|---|---|---|
| WO | 2012051884 A1 | 4/2012 |
| WO | 2012093429 A1 | 7/2012 |
| WO | 2012174980 A1 | 12/2012 |
| WO | 2013020126 A1 | 2/2013 |
| WO | 2013026049 A1 | 2/2013 |
| WO | 2013063330 A1 | 5/2013 |
| WO | 2013074827 A1 | 5/2013 |
| WO | 2013184846 A1 | 12/2013 |
| WO | 2013185715 A1 | 12/2013 |
| WO | 2015054671 A2 | 4/2015 |
| WO | 2015147942 A1 | 10/2015 |
| WO | 2016053372 A1 | 4/2016 |
| WO | 2016053640 A1 | 4/2016 |
| WO | 2017003957 A1 | 1/2017 |

OTHER PUBLICATIONS

Aggarwal, R., et al., "Data Center Mobility based on E-VPN, BGP/MPLS IP VPN, IP Routing and NHRP," draft-Raggarwa-data-center-mobility-05.txt, Jun. 10, 2013, 24 pages, Internet Engineering Task Force, IETF, Geneva, Switzerland.

Anwer, Muhammad Bilal, et al., "Building A Fast, Virtualized Data Plane with Programmable Hardware," Aug. 17, 2009, 8 pages, VISA'09, ACM, Barcelona, Spain.

Author Unknown, "IEEE Standard for Local and metropolitan area networks—Virtual Bridged Local Area Networks, Amendment 5: Connectivity Fault Management," IEEE Std 802.1ag-2007, Dec. 17, 2007, 260 pages, EEE, New York, NY, USA.

Casado, Martin, et al., "Virtualizing the Network Forwarding Plane," Dec. 2010, 6 pages.

Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011, 31 pages.

Kamath, Daya, et al., "Edge Virtual Bridge Proposal," Version 0. Rev. 0.1, Apr. 23, 2010, 72 pages, IEEE.

Keller, Eric, et al., "The 'Platform as a Service' Model for Networking," Month Unknown 2010, 6 pages.

Koponen, Teemu, et al., "Network Virtualization in Multi-tenant Datacenters," Technical Report TR-2013-001E, Aug. 2013, 22 pages, VMware, Inc., Palo Alto, Ca, USA.

Nygren, Anders, et al., "OpenFlow Switch Specification v.1.3.4 (Protocol version 0x04)," Mar. 27, 2014, 171 pages, Open Networking Foundation, Palo Alto, USA.

Shenker, ScoTT, et al., "The Future of Networking, and the Past of Protocols," Dec. 2, 2011, 30 pages, USA.

Watsen, Kent, "Conditional Enablement of Configuration Nodes," Feb. 18, 2013, 8 pages, Internet Engineering Task Force Trust, Reston, USA.

Credle, Rufus, et al., "Implementing a VM-Aware Network Using VMready," First Edition—IBM Redbooks, Aug. 2012, 256 pages, International Business Machines Corporation, Armonk, NY.

International Search Report and Written Opinion of Commonly Owned International Patent Application PCT/US2014/072890, dated Oct. 6, 2015, 24 pages, ISA (EPO).

Non-Published Commonly Owned U.S. Appl. No. 16/680,432, filed Nov. 11, 2019, 113 pages, Nicira, Inc.

Miahalingam, M., et al., "Virtual extensible Local Area Network (VXLAN): A Framework for Overlaying Virtualized Layer 2 over Layer 3 Networks," RFC7348, Aug. 26, 2014, 23 pages.

Non-Published Commonly Owned U.S. Appl. No. 17/524,979, filed Nov. 12, 2021, 83 pages, Nicira, Inc.

* cited by examiner

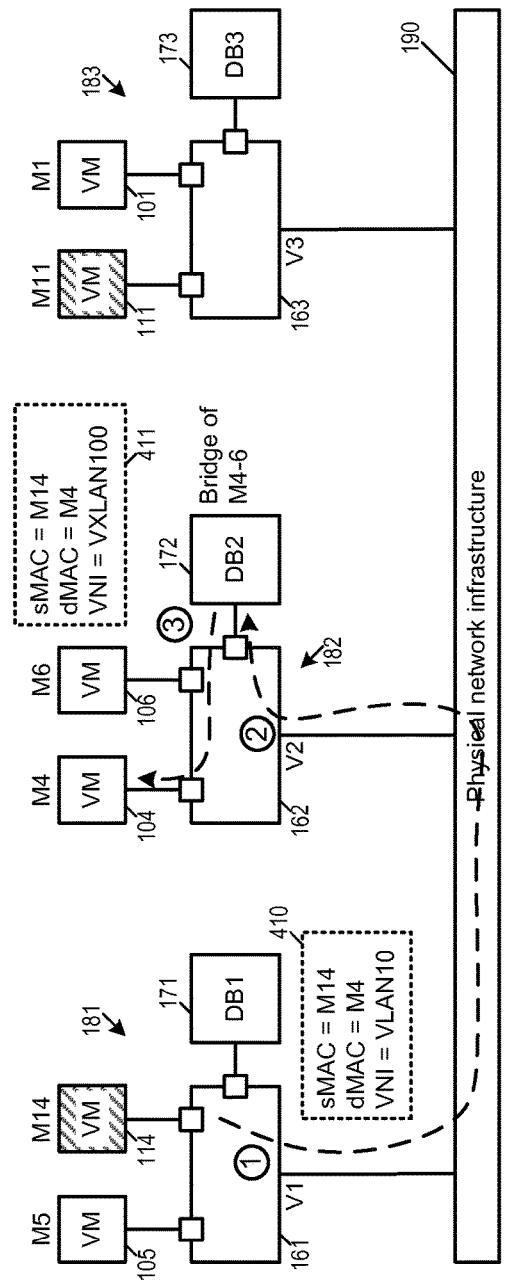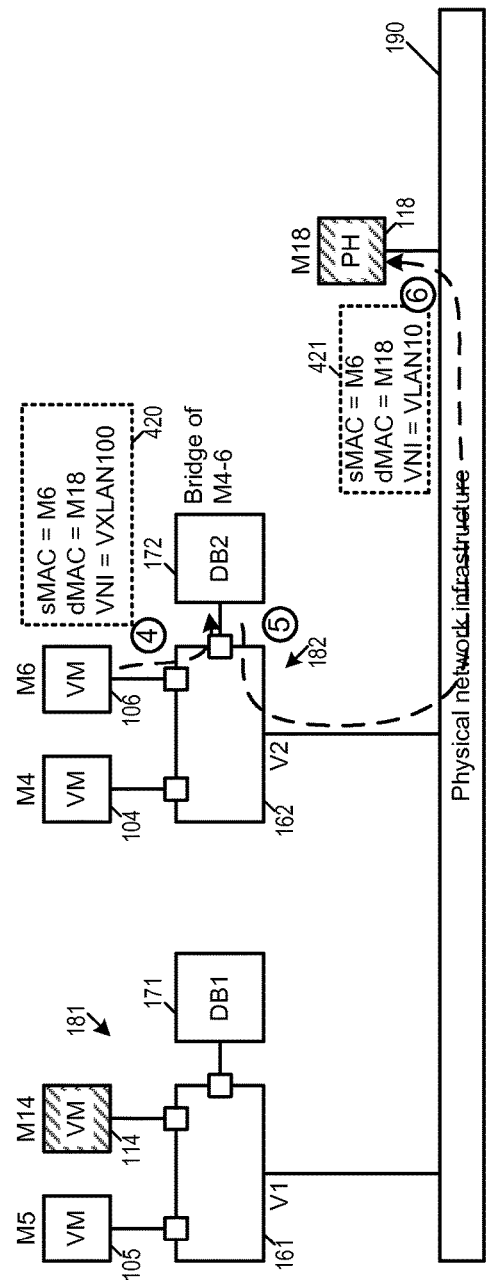
Figure 4a
Figure 4b

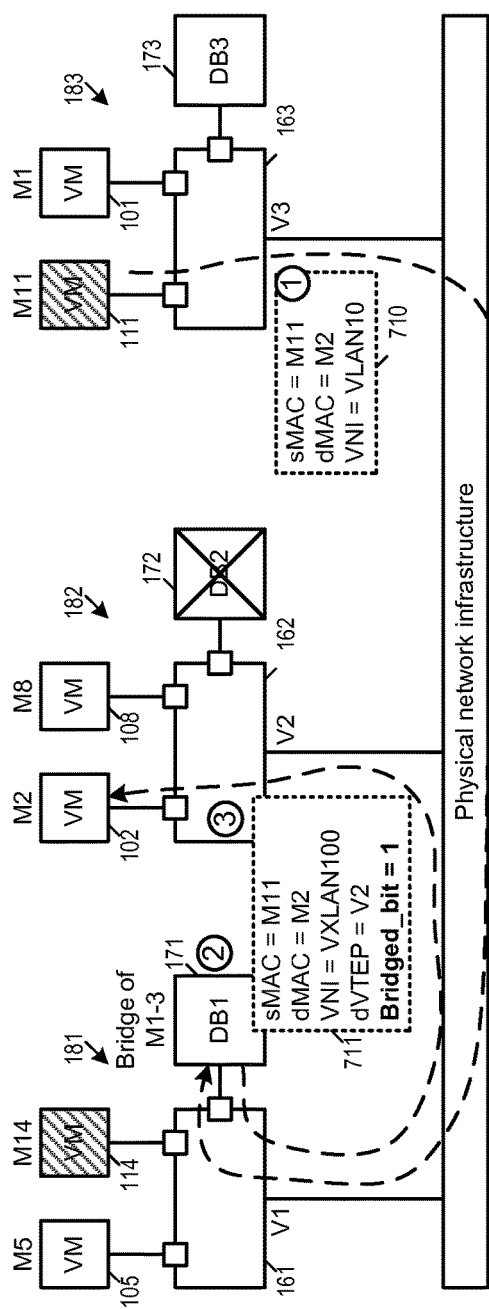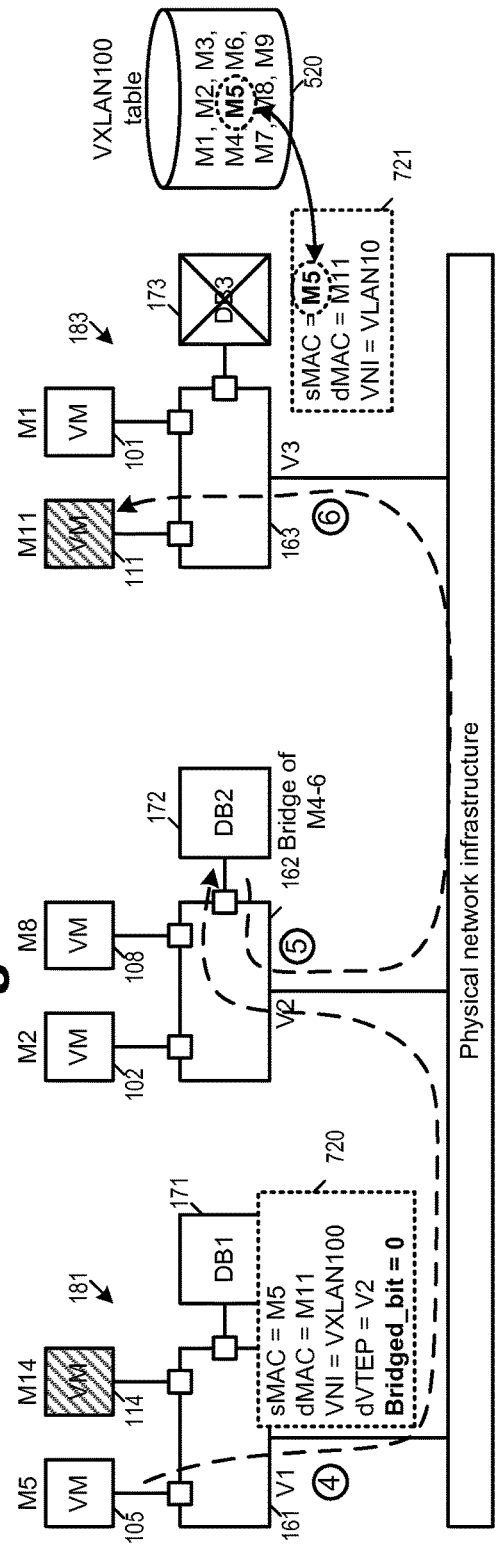
*Figure 7a*
*Figure 7b*

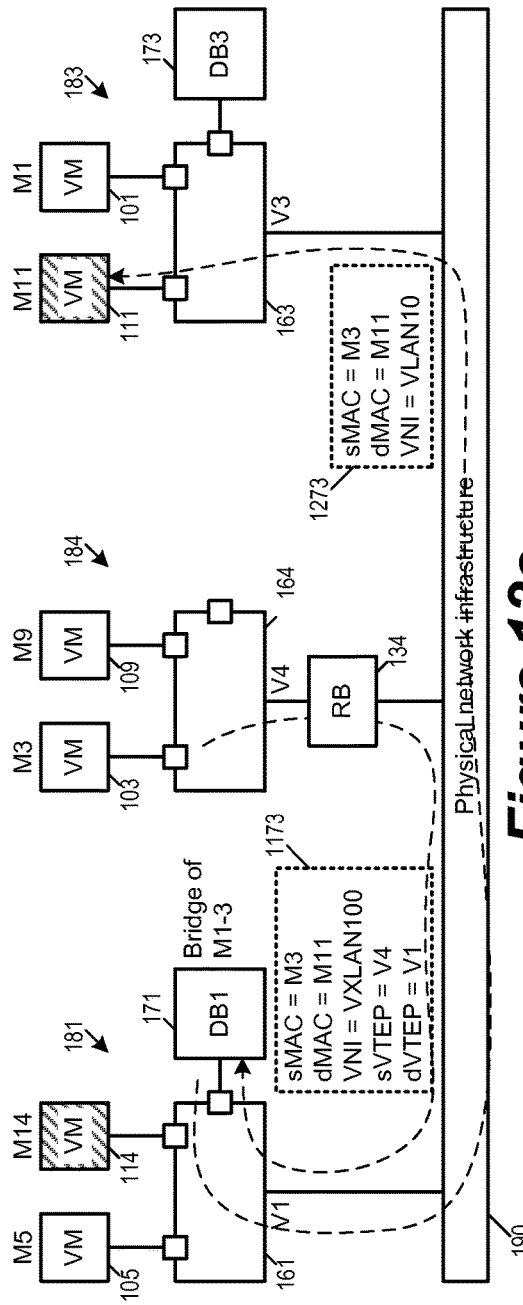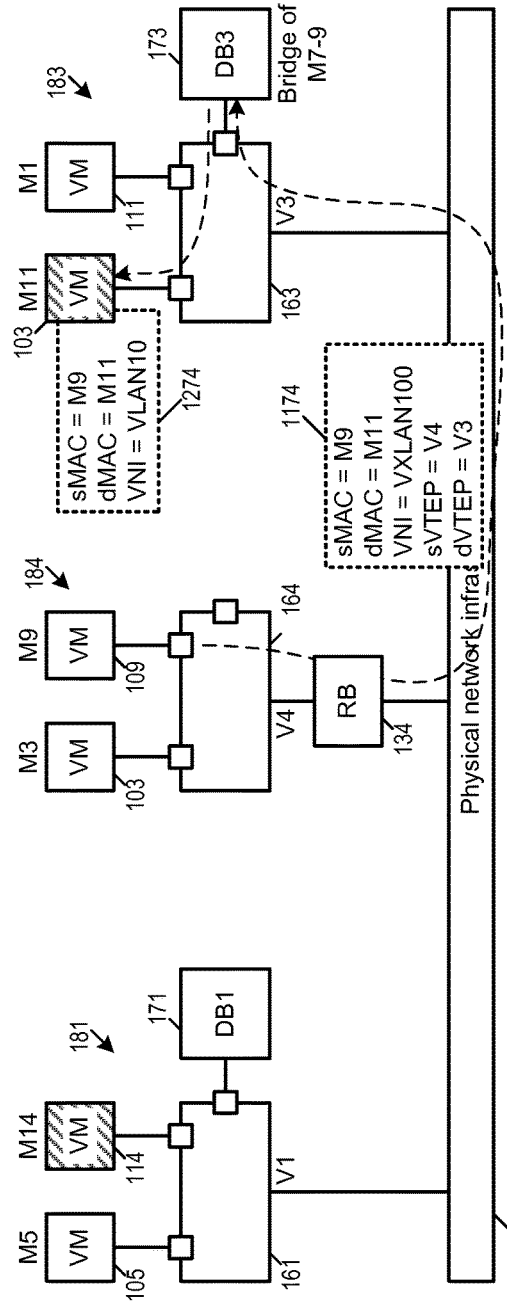

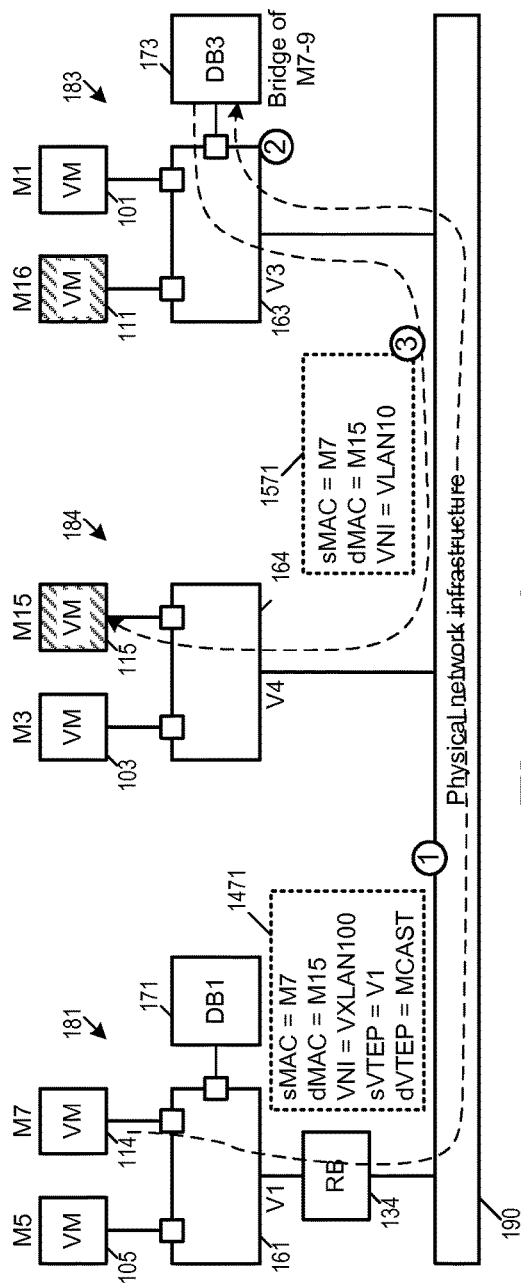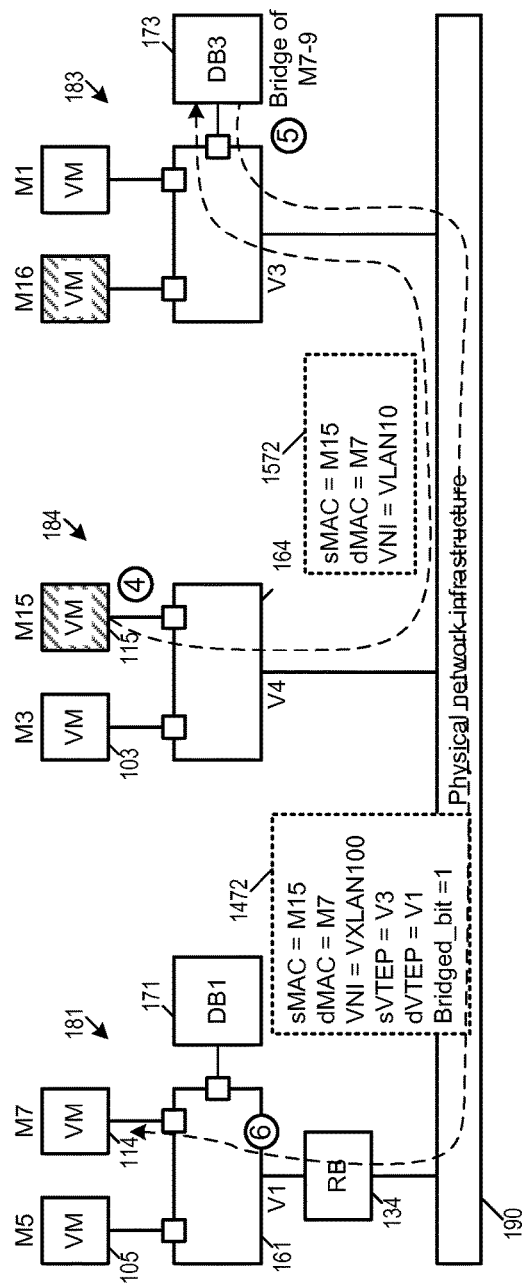

VIRTUAL DISTRIBUTED BRIDGING

CLAIM OF BENEFIT TO PRIOR APPLICATIONS

This application is a divisional application of U.S. patent application Ser. No. 14/503,168, filed Sep. 30, 2014, now published as U.S. Patent Publication 2016/0094365. U.S. patent application Ser. No. 14/503,168, now published as U.S. Patent Publication 2016/0094365, is incorporated herein by reference.

BACKGROUND

The advantage of a logical network implemented with hypervisors is well understood. However, it is still often necessary to provide bridging between a logical network (such as VXLAN) and a physical network (such as VLAN). This is particularly so when customers of network virtualization need L2 centric protocols on hybrid networks where logical networks and physical networks co-exist. Bridging also allows seamlessly transition between L2 centric workloads into VMs on hypervisors.

SUMMARY

In some embodiments, virtualization software running in host machines includes a VDRB (virtual distributed router/bridge) module for performing L3 routing and/or bridging operations that delivers packet from one network segment to another network segment. In some embodiments, at least some of the VDRBs are configured as VDBs (virtual distributed bridge) for performing bridging operations between different network segments in a distributed manner, with bridging tasks partitioned among the VDBs in the different host machines.

In some embodiments, the bridging tasks of a network are partitioned among several VDBs of the network based on MAC addresses. Specifically, in some embodiments, MAC addresses of VMs or other types of network nodes belonging to an overlay logical network are partitioned into several shards, each shard of MAC addresses assigned to a VDB in the network. Each VDB assigned a shard of MAC addresses performs bridging when it receives a packet bearing a MAC address belonging to its assigned shard. A VDB does not perform bridging on packets that do not have MAC address that falls within the VDB's shard of MAC addresses.

In some embodiments, the shards of MAC addresses are created by a central network controller. The central network controller gathers all of the MAC addresses from one of the network segments being bridged. The gathered MAC addresses are then divided into shards of MAC addresses. Each shard is then assigned to a VDRB so the assign VDRB becomes the DB (designated bridge) for the MAC address in the shard.

In some embodiments, if a DB has failed, the controller re-shards the MAC addresses and redistributes the MAC addresses to the DBs that are still alive. In some embodiments, the number of DB instances participating in bridging can grow or shrink dynamically to respond to changing workload. In case of host failure, the workload will be redistributed to other hosts. In some embodiments, the controller initiates resharding whenever it detects an event that requires the MAC addresses to be redistributed among the available DBs, such as when there is a change in the number of available DBs (e.g., a DB has failed, or if a new DB has come on line), or when there is a change in the list of known MAC addresses for bridging (e.g., VMs going off line or on line).

In some embodiments, distributed bridging scheme prevents loops and duplicates between the distributed VDB instances by introducing mechanisms to prevent a bridged packet from being bridged again. In some embodiments, a DB marks a packet that it bridges with a flag to indicate that the packet is a bridged packet, and that no other DB should bridge the packet again. In some embodiments, a DB examines a table to see if the source MAC address is that of a different network segment, and hence a bridged packet that should not be bridged again.

A host machine in some embodiments identifies a tunnel endpoint (i.e., host machine) that operates the correct DB based on the source MAC address. In some embodiments, each host machine is provided a table by the central network controller detailing which DB in which host machine owns which shard of MAC addresses. In some embodiments, a host machine learns the sharding information on its own without the controller provided table based on packets that it has received from the physical network infrastructure. The host machine in turn uses the learned information to identify the DBs that should be used for bridging its outgoing packets. In some embodiments, for each incoming VXLAN packet, the host machines associates the source MAC address and the source tunnel address and learns the association so the host machine would know which tunnel address to use when sending an encapsulated packet back to the source MAC address. In some embodiments, the host machine learns the pairing between the destination MAC address (if in VXLAN) and the source tunnel address in order to determine which DB is assigned the shard that includes the destination MAC address. In some embodiments, when a host machine has to send a VXLAN packet to be bridged without having already learned the VTEP IP of the corresponding DB, it floods the network with a BUM (broadcast, unknown uncast, or multicast) packet in order to find out the VTEP IP of the unknown DB.

In some embodiments, DBs for bridging between a particular VXLAN and a particular VLAN are instantiated only in host machines in an L2 segment or cluster that is shared by both the VXLAN and the VLAN. In some embodiments, a cluster that is shared by VXLAN and the VLAN is a service cluster for providing communications access to Internet and the outside worlds, while other clusters are compute clusters for performing the bulk of computation tasks. In some embodiments, a RB in a host machine is for identifying the DB that owns a particular VXLAN MAC address. This allows a host machine of VXLAN VMs to be able send an encapsulated packet to the tunnel endpoint that hosts the identified DB, even if the host machine and the DB are in different L2 segments or clusters.

In some embodiments, distributed bridging relies on local bridges (LB) in some of the host machines. A LB of a host machine in some embodiments handles the bridging of packets that are destined to or sourced by VMs running on that host machine. In some embodiments, the LBs in the host machines offload bridging tasks from one or more designated bridges (DB) such that a DB only performs bridging on VXLAN MAC addresses that are not serviced by the LBs in the network. In some embodiments, a DB serves as the default bridge for handling bridging tasks that are not handled by the LBs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 4a-b illustrate the bridging of packets when the source or destination VM is a local VM on the same host machine as the VDB.

FIGS. 7a-b illustrate the prevention of bridging loops for some embodiments of the invention.

FIGS. 12a-b illustrate the bridging of packets by their correspondingly identified DBs.

FIG. 15a illustrates the bridging of a BUM packet from its source in VXLAN to its destination in VLAN.

FIG. 15b illustrates the bridging of a reply packet from VLAN back to VXLAN.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Network bridging is the action taken by network equipment to create an aggregate network from either two or more communication networks, or two or more network segments, or between a logical network (e.g., an overlay logical network such as VXLAN) and a physical network segment (e.g., a physical or virtual L2 network such as VLAN). Some embodiments distribute bridging tasks among multiple different network bridges. In some embodiments, each of these network bridges is operated by a host machine running virtualization software or hypervisor that has a distributed instance of a Virtual Distributed Bridge (VDB).

Figure 1:
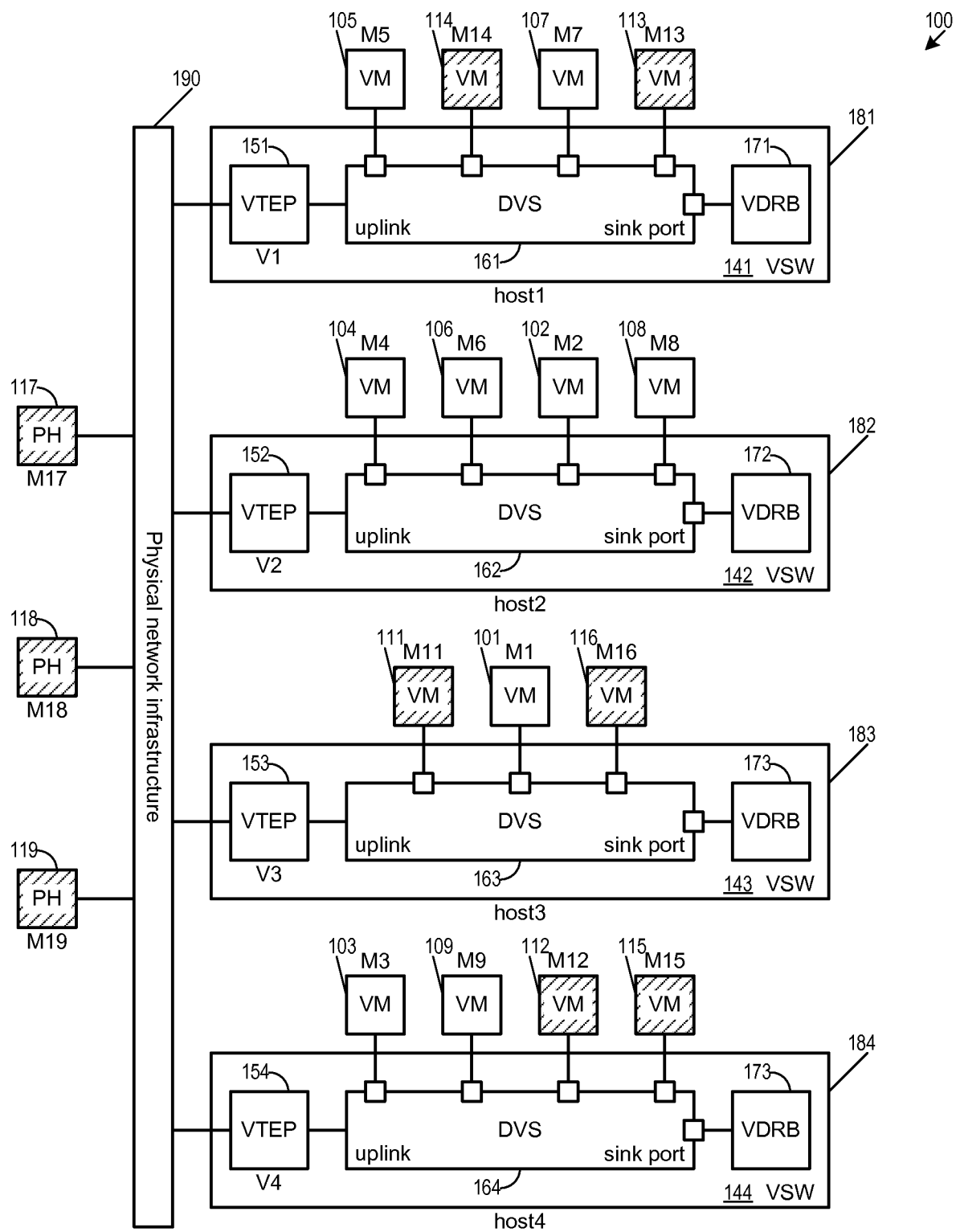
FIG. 1 illustrates a network in which bridging between an overlay logical network and a physical network segment is conducted in a distributed manner.

FIG. 1 illustrates a network 100 in which bridging between an overlay logical network and a physical network segment is conducted in a distributed manner. Specifically, the bridging tasks are partitioned between VDB instances in different host machines 181-184, each host machine operating virtualization software that performs a VDB instance. The host machines 181-184 are hosting virtual machines 101-116 (VMs), some of the VMs are operating in the overlay logical network VXLAN100, some of the VMs are operating in the physical network segment VLAN10. In this document, the term "VXLAN" (Virtual Extensible LAN) sometimes refers to an overlay logical network that is defined by a VNI, while the term "VLAN" (Virtual LAN) sometimes refers to a physical network segment or L2 network that is defined by an IP subnet or VLAN ID. Throughout this document, VXLAN100 is used to refer to an example overlay logical network that uses VXLAN or other overlay encapsulation network, while VLAN10 is used to refer to an example physical network segment or IP subnet.

As illustrated, the host machine 181 is hosting VMs 105, 114, 107, and 113. The host machine 182 is hosting VMs 104, 106, 102, and 108. The host machine 183 is hosting VMs 111, 101, and 116. The host machine 184 is hosting VMs 103, 109, 112, and 115. A physical network infrastructure 190 interconnects the host machines 181-184, as well as physical host machines (PHs) 117-119. The VMs 101-109 communicate over physical network infrastructure 190 in the overlay logical network VXLAN100. The VMs 111-116 and the PHs 117-119 communicate over physical network infrastructure 190 in physical network segment VLAN10. The VMs 101-116 have MAC (Media Access Control or L2 link layer) addresses M1-M16, respectively, while the PHs 117-119 have MAC addresses M17-M19, respectively.

The physical network infrastructure 190 supports the overlay logical network VXLAN100 and the physical network segment VLAN10. In some embodiments, the traffic in an overlay logical network is conducted by sending packets encapsulated under the protocols of the logical networks and tunneled between the tunnel endpoints of the logical networks. Specifically, the virtualization software operating in the host machine 181-0184 allows each of those host machines to serve as tunnel endpoints in the overlay logical networks by encapsulating and decapsulating packets according overlay logical network standards such as VXLAN. In some embodiments, the physical network infrastructure 190 spans across one or more data centers and/or (internet service) provider networks such that at least some of the physically distinct sets of communication pathways are in the data centers or provider networks. In some embodiments, an overlay logical network operates as an overlay logical switch that provides L2 connectivity to a collection of VMs over an underlying L3 network (hence the terms "logical switch" and "overlay logical network" are interchangeably used).

The host machines 181-184 are computing devices that supports one or more virtual machines. Each host machine communicates with other computing devices, including other host machines through the physical network infrastructure 190. As illustrated, each of the host machines 181-184 is operating virtualization software (VSW), which allows these computing devices to serve as host machines for virtual machines by managing the operations of the VMs as well as their access to the computing resources and the network resources of the host machines. In some embodiments, the virtualization software provides an interface between each VM and a logical switch supported by the underlying network. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "hypervisor" is intended to generically refer to a software layer or component logically interposed between a virtual machine and the host platform. Computing devices that serve as host machines will be further described in Section IV below.

The virtualization software (VSW) of each host machine operates an overlay network tunnel endpoint (VTEP), a distributed virtual switch (DVS), and a virtual distributed router/bridge (VDRB) module. As illustrated, the host machine 181 is operating VSW 141 that includes a VTEP 151, a DVS 161, and a VDRB 171. The host machine 182 is operating VSW 142 that includes a VTEP 152, a DVS 162, and a VDRB 172. The host machine 183 is operating VSW 143 that includes a VTEP 153, a DVS 163, and a VDRB 173. The host machine 184 is operating VSW 144 that includes a VTEP 154, a DVS 164, and a VDRB 174.

The distributed switch (DVS) of each host machine handles L2 level traffic to and from the VMs. In some embodiments, the DVS of a host machine serves as a managed physical switching element (MPSE) for conducting L2 level switching operations within the host machine. The DVS (or MPSE) allows L2 level traffic to flow between VMs of a same host machine (e.g., the DVS of the host machine 181 handles L2 level traffic between the VMs 105 and 107.) The DVS also direct L2 level traffic between the physical network structure 190 and the VMs of its host machine. As illustrated, the DVS of each host machine includes a set of ports, through which the VMs of the host machine connects to the DVS. In some embodiments, each DVS port is associated with a MAC address such that the DVS is able to deliver data packets to one of its ports based on the destination MAC address specified in the data packets. In some embodiments, the delivery of data packets by the DVS is further based on a network segment identifier such as VNI (VXLAN network identifier). For the example network 100, the logical network VXLAN100 and the physical network VLAN10 are each identified by its own VNI. The use of VNI allows the DVS in some embodiments to distinguish between different L2 level traffic, e.g., between different IP subnets, between different physical network segments, between different logical networks, or between a logical network and a physical network. In other words, the DVS delivers a packet to a VM attached to a port only if the packet's VNI matches that of the VM and the destination MAC address of the packet matches that of the port.

The DVS of each host machine also includes a sink port, which handles all incoming data packets that does not have a destination MAC/VNI that matches one of the other ports. As illustrated, the sink port of the DVS is attached to a distributed router/bridge module (VDRB) module. In some embodiments, the VDRB is a managed physical routing element (MPRE) for handling L3 routing for traffic between different L2 network segments. In some of these embodiments, the MPRE is a local instantiation of a logical routing element (LRE) that spans across multiple host machines in order to perform L3 level routing (e.g., based on IP address) in a distributed manner by the multiple host machines. In some embodiments, the VDRB behaves as a VDB (virtual distributed bridge) for bridging packets from one network segment to another, which is accomplished by MAC address lookup rather than by IP address routing. In some embodiments, a packet is bridged rather than routed from one network segment to another when the source and the destination of the packet are in a same IP subnet but with different VNIs. To bridge a packet from one network segment to another, the VDRB uses the destination MAC address of the packet to lookup its corresponding VNI and produce a bridged packet in the network segment identified by the VNI. The bridged packet is then delivered according to the VNI and the destination MAC address by the DVS (of this host machine or another host machine).

The DVS of each host machine has an uplink connection to the physical network infrastructure 190. The traffic from the physical network infrastructure 190 enters the DVS through the uplink connection to reach the VMs and the VDRB attached to the DVS ports, and conversely the traffic from the VMs and the VDRB egresses the DVS into the physical network infrastructure 190 through the uplink. As illustrated, the uplink of the DVS in each host machine to the physical network infrastructure 190 is through overlay logical network tunnel endpoint (VTEP). In some embodiments, each tunnel endpoint is associated with a unique IP address (tunnel address or VTEP IP), and each host machine (i.e., its virtualization software) as a tunnel endpoint is assigned a tunnel address. The VTEP module of a host machine accepts packets from the physical network infrastructure 190 that bears the tunnel address of its host machine. As illustrated, the host machines 181-184 are assigned tunnel addresses of V1, V2, V3, and V4 respectively.

For outgoing packets to the physical network infrastructure, the VTEP module of a host machine in some embodiments encapsulate (or not) the packet according to the formats required by its VNI. For example, when a bridged packet produced by the VDRB 171 of the host machine 181 specifies a VNI for VXLAN100, the VTEP module 151 would encapsulate the packet according to VXLAN format before sending the encapsulated packet onto the physical network infrastructure 190. Conversely, the VTEP module of a host machine also processes incoming encapsulated packets by stripping the logical network encapsulation before letting the decapsulated packet reach the VMs and the VDRB through the DVS. In some embodiments, the uplink includes an egress path to and an ingress path from the physical network infrastructure 190 and the VTEP module performs overlay logical network encapsulation and decapsulation at separate modules at the ingress path and the egress path.

The physical host machines (PHs) 117-119 are nodes that do not run virtualization software and does not host any VMs. In some embodiments, some physical host machines are legacy network elements (such as filer or another non-hypervisor/non-VM network stack) built into the underlying physical network, which used to rely on standalone routers for L3 layer routing. In some embodiments, a PH is an edge router or a routing gateway that serves as an interface for overlay logical networks (i.e., VXLAN100) with other external networks. In some embodiments, such an edge router is a VM running on a host machine that operates hypervisor/virtualization software, but the host machine of the edge router does not operate a VDRB. Further descriptions of MPSEs, MPREs, LREs, and PHs can be found in U.S. Pat. No. 9,785,455. U.S. Pat. No. 9,785,455 is herein incorporated by reference.

As mentioned, the virtualization software running in each of the host machines 181-184 includes a VDRB module for performing L3 routing and/or bridging operations that delivers packet from one network segment to another network segment. In some embodiments, at least some of the VDRBs are configured as VDBs (virtual distributed bridge) for performing bridging operations between different network segments in a distributed manner, with bridging tasks partitioned among the VDBs in the different host machines.

Several more detailed embodiments of the invention are described below. Section I describes partitioning bridging tasks based on sharding MAC addresses among several VDBs. Section II describes identifying a remote VDB in another host machine for bridging a packet. Section III describes assigning bridging tasks to VDBs that are local to the VMs of overlay logical works. Section IV describes an example communications device that implements some embodiments of the invention. Finally, section V describes an electronic system with which some embodiments of the invention are implemented.

I. Bridging by Sharding MAC Addresses

In some embodiments, the bridging tasks of a network are partitioned among several VDBs of the network based on MAC addresses. Specifically, in some embodiments, MAC addresses of VMs or other types of network nodes belonging to an overlay logical network are partitioned into several shards, each shard of MAC addresses assigned to a VDB in the network. Each VDB assigned a shard of MAC addresses performs bridging when it receives a packet bearing a MAC address belonging to its assigned shard. A VDB does not perform bridging on packets that do not have MAC address that falls within the VDB's shard of MAC addresses.

Figure 2:
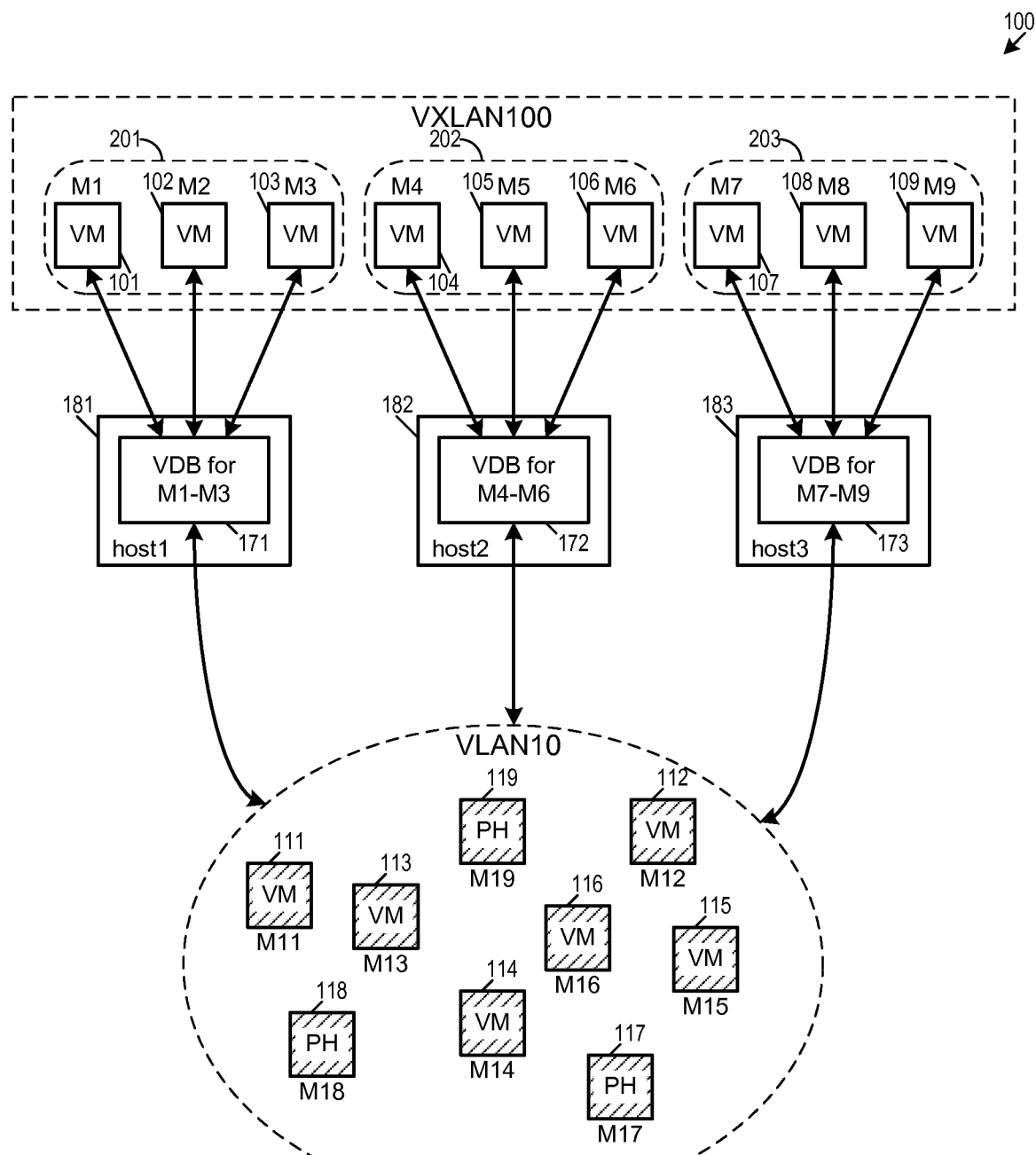
FIG. 2 conceptually illustrates distributed bridging by sharing MAC addresses for the network.

For some embodiments, FIG. 2 conceptually illustrates distributed bridging by sharing MAC addresses for the network 100. As previously mentioned, the network 100 is built on a physical network infrastructure 190 that supports an overlay logical network VXLAN100 and a physical network segment VLAN10. As illustrated, the MAC addresses of VMs in the VXLAN100 are divided among three shards 201-203. The shard 201 includes MAC addresses M1-M3 belonging to the VMs 101-0103. The shard 202 includes MAC addresses M4-M6 belonging to the VMs 104-0106. The shard 203 includes MAC addresses M7-M9 belonging to the VMs 107-0109. The shards do not include MAC addresses from VLAN10.

In some embodiments, when bridging between two different network segments (such as VLAN10 and VXLAN100), the MAC address in only one of the network segments is sharded for purpose of bridging. In other words, some embodiments decide which bridge should be used for bridging a packet based on MAC addresses of only one of the segments. In this example, since a packet that requires bridging necessarily bears one MAC from VXLAN100 and one MAC from VLAN10, using only VXLAN100 MAC to select distributed bridge is sufficient to partition all possible bridging tasks. This also ensures that only one distributed bridge is chosen for each packet that requires bridging (rather than two distributed bridges based on both the VXLAN address and the VLAN address).

VDBs in host machines 181-183 are for bridging packets between VXLAN100 and VLAN10. The VDBs 171-173 in the host machines 181-183 are each assigned a shard of MAC addresses from the shards 201-203, respectively. In some embodiments, a VDB instance in a host machine that is assigned a shard of MAC addresses is referred to as a designated bridge or "DB" for handling those MAC addresses in the shard. In some embodiments, the DB assigned a shard builds an "include table" that lists the MAC addresses in the shard such that only packets with the MAC addresses included in the table will be bridged.

Each of these VDBs bridges a packet if the packet's source or destination MAC address falls within its assigned shard. As illustrated, the VDB 171 in the host machine 181 is for bridging packets to or from VMs with MAC addresses M1-M3. The VDB 172 in the host machine 182 is for bridging packets to or from VMs with MAC addresses M4-M6. The VDB 173 in the host machine 183 is for bridging packets to or from VMs with MAC addresses M7-M9. Each of the VDBs 171-173 is for bridging the VMs of its shard with the VMs (111-116) and PHs (117-119) in the VLAN10.

The VDRB 174 in the host machine 184 (not illustrated) is not assigned a shard of MAC addresses and therefore will not participate in bridging operations between VXLAN100 and VLAN10. The example MAC addresses sharding scheme used in FIG. 2 will be relied upon for discussions in Sections I and II. However, one of ordinary skill would understand that the sharding scheme used in FIG. 2 and subsequent figures is arbitrarily chosen for purpose of illustration only.

Figure 3A:
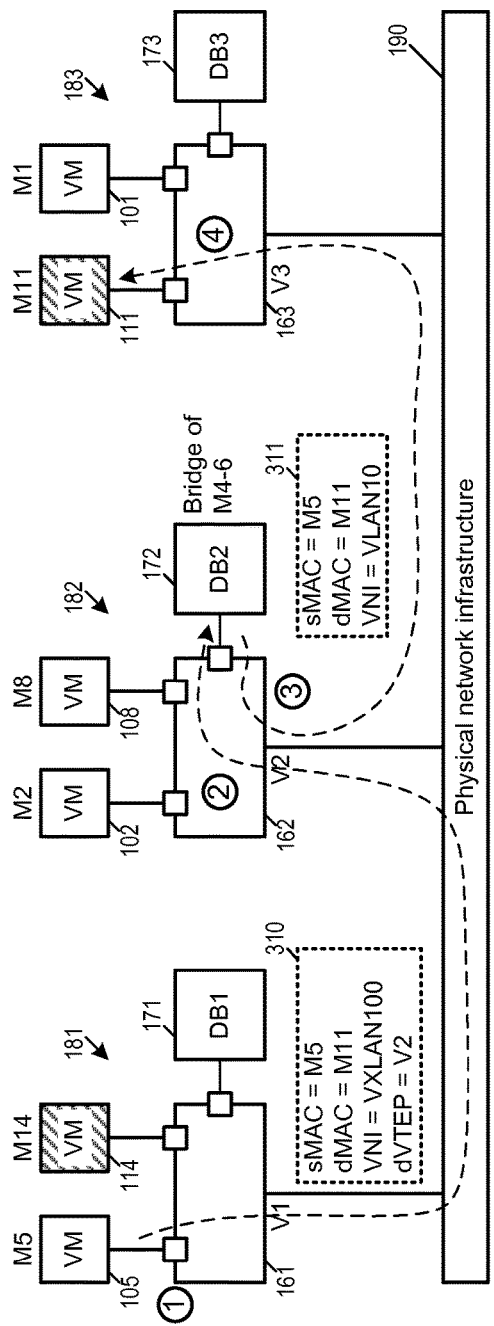
FIGS. 3a-b illustrate the bridging of packets between VMs in an overlay logical network and VMs in the physical network segment.
Figure 3B:
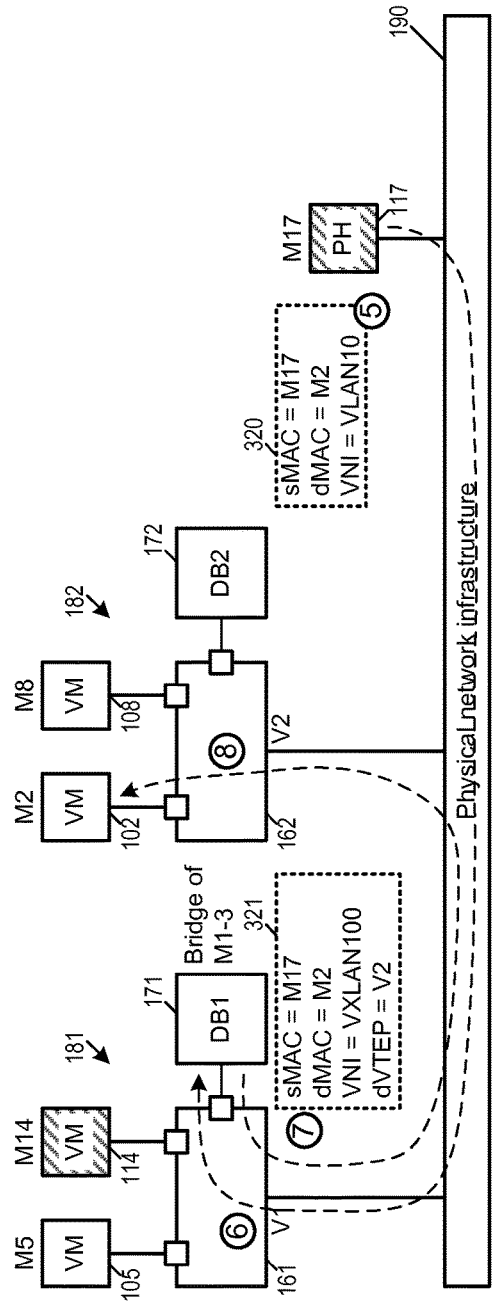

FIGS. 3*a-b* illustrate the bridging of packets between VMs in the overlay logical network VXLAN100 and VMs in the physical network segment VLAN10 in the network 100 according to the sharding of MAC addresses of FIG. 2. FIG. 3*a* illustrates the bridging of a packet 310 from the VM 105 (MAC address M5) in VXLAN100 to the VM 111 in VLAN10 (MAC address M11). FIG. 3b illustrates the bridging of a packet 320 from the PH 117 (MAC address M17) to the VM 102 (MAC address M2). According to the example sharding scheme of FIG. 2, the MAC address M5 is in a shard that is assigned to the VDRB 172 (DB2), while the MAC address M2 is in a shard that is assigned to the VDRB 171 (DB1).

FIG. 3a illustrates the bridging of the packet 310 in four operations labeled '1', '2', '3', and '4'. At the first operation labeled '1', the VM 105 produces a packet 310 destined for the VM 111 by specifying source MAC address M5 and destination MAC address M11. Since the VM 105 is in the VXLAN100, the host machine 181 encapsulates the packet 310 with VNI indicating that the packet belongs to VXLAN100. Furthermore, since the VXLAN100 address of the packet 310 (its source MAC M5) is sharded to DB2, the host machine 181 tunnels the packet 310 to the host machine 182, which operates DB2 (172). The host machine 181 injects the encapsulated packet 310 into the physical network infrastructure 190.

At the second operation labeled '2', the encapsulated packet 310 reaches the host machine 182 through the physical network infrastructure 190. The host machine 182 decapsulates the packet 310 at its uplink and allows the decapsulated packet to reach its DVS 162. In some embodiments, each packet is tagged with it VNI even after the packet is decapsulated. Since the destination MAC address (M11) and the VNI (VXLAN100) do not match any of the port of the DVS 162, the DVS sends the packet to its sink port (and to the DB 172).

At the third operation labeled '3', the DB 172 recognizes that the source MAC address M5 is in the shard (202) assigned to it and accepts the packet 310 for bridging. The DB 172 performs a lookup for VNI based on the destination MAC address M11 and determines that M11 belongs to VLAN10. It in turn produced a bridged packet 311 with a VNI for VLAN10. The bridged packet 311 has the same source and destination MAC address M5 and M11. The host machine 182 then injects the bridged packet 311 into the physical network infrastructure 190.

At the fourth operation labeled '4', the bridged packet 311 reaches the host machine 183. Since the destination MAC address and the VNI of the bridged packet 311 (M11 and VLAN10) matches that of the VM 111, the DVS 163 of the host machine 183 forward the packet 311 to the VM 111.

FIG. 3b illustrates the bridging of the packet 320 in four operations labeled '5', '6', '7', and '8'. (The operations '5' through '8' are not necessarily subsequent operations of the operations '1', '2', '3', and '4'.) At the first operation labeled '5', the PH 117 (MAC M17) produces a packet 320 destined for the VM 102 by specifying source MAC address M17 and destination MAC address M2. Since the PH 117 is a physical host in the attached to the physical network segment VLAN10, the packet 320 is injected into the physical network infrastructure 190 with VNI (i.e., the VLAN ID) indicating that the packet belongs to VLAN10.

At the second operation labeled '6', the packet 320 reaches the host machine 181 through the physical network infrastructure 190. The packet enters the DVS 161 of the host machine 181 through its uplink. In some embodiments, regardless of the encapsulation format of the packet, the uplink tags the packet with its VNI (VXLAN network identifier or VLAN ID). Since the destination MAC address (M2) and the VNI (VLAN10) do not match any of the port of the DVS 161, the DVS sends the packet to its sink port (and to the DB 171). Though not illustrated, the packet 320 also reaches other host machines and ended up in at the sink port of those other host machines as well.

At the third operation labeled '7', the DB 171 recognizes that the destination MAC address M2 is in the shard (the shard 201 of FIG. 2 that includes M1-M3) assigned to it and accepts the packet 320 for bridging. Though not illustrated, other DBs in other host machines do not recognize that the destination MAC address M2 is in the shards assigned to them and consequently do not accept the packet 320 for bridging. The DB 171 performs a lookup based on the destination MAC address M2 and determines that M2 belongs to VXLAN100. It in turn produces a bridged packet 321 with a VNI for VXLAN100. The bridged packet 311 has the same source and destination MAC address M11 and M2. Since the VNI of the bridged packet is VXLAN100, the host machine 181 encapsulates the packet 310 under VXLAN. The encapsulated packet indicates that the encapsulated packet is destined for a tunnel endpoint with IP address 'V2', which is the tunnel address of the host machine 182 that hosts the VM 102 with MAC address M2. The host machine 181 then injects the encapsulated packet 321 into the physical network infrastructure 190.

At the fourth operation labeled '8', the encapsulated bridged packet 321 reaches the host machine 182, which is the tunnel endpoint with tunnel address V2. Since the destination MAC address and the VNI of the bridged packet 321 (M2 and VXLAN100) matches that of the VM 102, the DVS 162 of the host machine 182 forward the bridged packet 321 to the VM 102.

FIGS. 3a-b illustrates example bridging operations in which the VDB selected to perform the bridging operation based on MAC address sharding is not a local VDB instance (i.e., not in the same host machine as the source or destination VM). In some embodiments, the VDB that is selected by sharding to perform bridging operation is a local VDB instance (i.e., in the same host machine as either the source or destination VM). In some of these embodiments, the DVS directly forwards packet between the local VDB and the local VM without going through the physical network infrastructure.

FIGS. 4a-b illustrate the bridging of packets when the source or destination VM is a local VM on the same host machine as the VDB. FIG. 4a illustrates the bridging of a packet 410 from the VM 114 (MAC address M14) in VLAN10 to the VM 104 in VXLAN100 (MAC address M4) in the network 100. FIG. 4b illustrates the bridging of a packet 420 from the VM 106 (MAC address M6) in VXLAN100 to the PH 118 (MAC address M18) in VLAN10 in the network 100. According to the example sharding scheme of FIG. 2, both MAC addresses M4 and M6 are in a shard (the shard 202) that is assigned to the VDRB 172. Since the VDRB 172 and the MAC address M2 (and M4) are in a same host machine 182, the DVS 162 of the host machine 182 would directly forward the packet between the VDRB 172 and the VM 102 (and the VM 104) during bridging operations.

FIG. 4a illustrates the bridging of the packet 410 in three operations labeled '1', '2', and '3'. At the first operation labeled '1', the VM 114 produces a packet 410 destined for the VM 104 by specifying source MAC address M14 and destination MAC address M4. Since the VM 114 is in the VLAN10, the packet 410 is injected directly into the physical network infrastructure 190 without encapsulation for overlay logical network, while the VNI indicating that the packet belongs to VLAN10.

At the second operation labeled '2', the packet 410 reaches the host machine 182 through the physical network infrastructure 190. The packet enters the DVS 162 of the host machine 182. Since the destination MAC address (M4) and the VNI (VLAN10) do not match any of the port of the DVS 162, the DVS sends the packet to its sink port (and to the DB 172). Though not illustrated, the packet 320 also reaches other host machines and ended up in at the sink port of those other host machines as well.

At the third operation labeled '3', the DB 172 recognizes that the destination MAC address M4 is in the shard (202) assigned to it and accepts the packet 410 for bridging. Though not illustrated, other DBs in other host machines (i.e, the DBs 171 and DB 173) do not recognize that the destination MAC address M4 is in the shards assigned to them and consequently do not accept the packet 410 for bridging. The DB 172 performs a lookup based on the destination MAC address M4 and determines that M4 belongs to VXLAN100. It in turn produced a bridged packet 411 with a VNI for VLAN10. Since the destination MAC address and the VNI of the bridged packet 411 (M4 and VXLAN100) matches that of the VM 104, the DVS 162 of the host machine 182 forward the bridged packet 411 to the VM 102 without going through the physical network infrastructure 190.

FIG. 4b illustrates the bridging of the packet 420 in three operations labeled '4', '5', and '6'. At the first operation labeled '4', the VM 106 (M6) produces a packet 420 destined for the VM 111 by specifying source MAC address M6 and destination MAC address M18, with VNI for VXLAN100. Since the destination MAC M18 and the VNI VXLAN100 does not match any port in the DVS 162, the DVS forwards the packet to its sink port (and to the DB 172).

At the second operation labeled '5', the DB 172 recognizes that the source MAC address M6 is in the shard (the shard 202 of FIG. 2) assigned to it and accepts the packet 420 for bridging. Since the DB 172 has accepted the packet 420 for bridging, the host machine 182 will not transmit the packet 420 onto the physical network infrastructure 190, and the packet is not encapsulated for VXLAN100. The DB 172 performs a lookup based on the destination MAC address M18 and determines that M18 belongs to VLAN10. It in turn produced a bridged packet 421 with a VNI for VLAN10. The bridged packet 311 has the same source and destination MAC address M6 and M18 respectively. The host machine 182 then injects the bridged packet 421 into the physical network infrastructure 190.

At the third operation labeled '6', the bridged packet 421 reaches the PH 118 (M18), which is a physical host attached to the physical network segment VLAN10.

Figure 5:
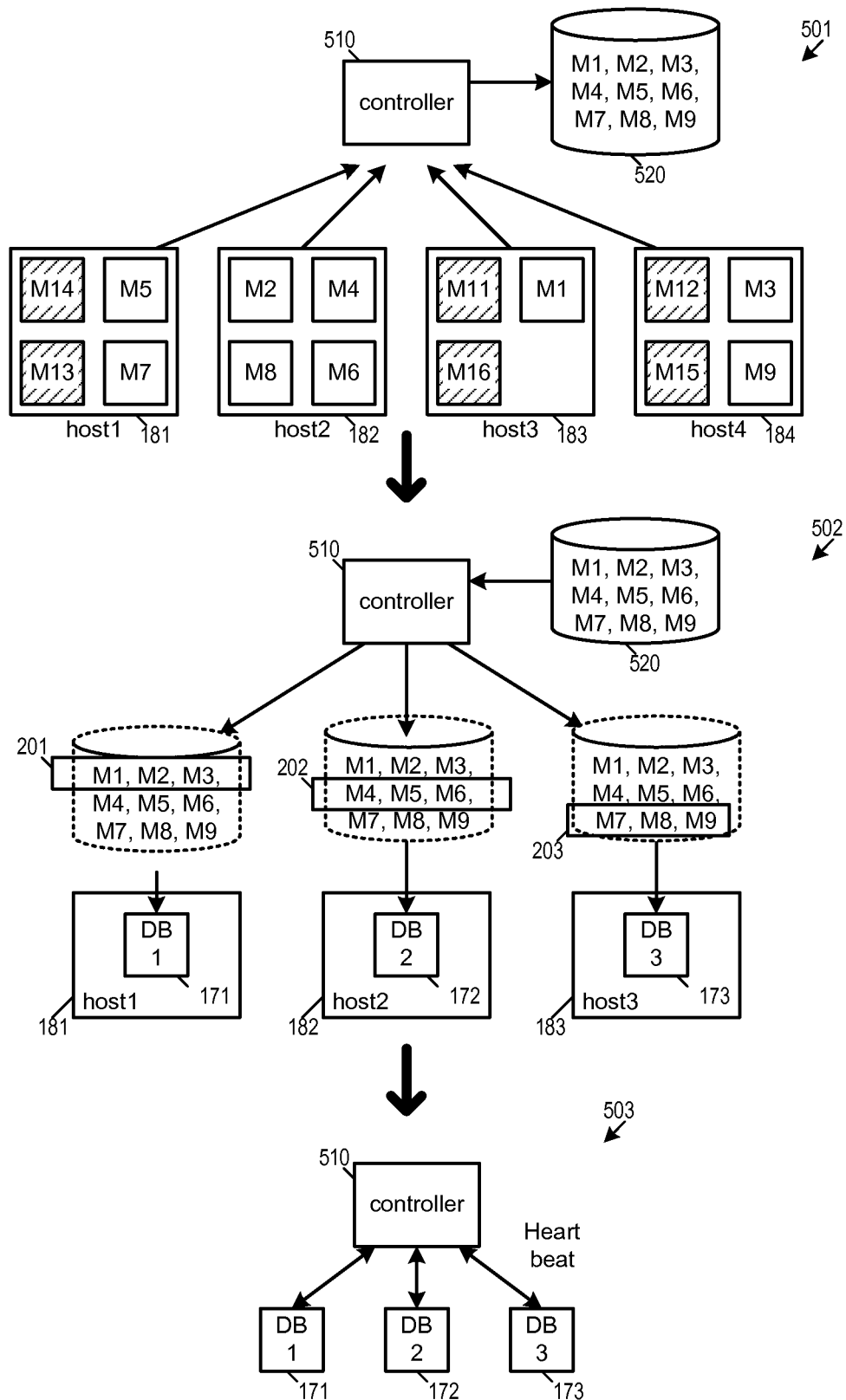
FIG. 5 conceptually illustrates the sharding MAC address by a controller of the network.

In some embodiments, the shards of MAC addresses are created by a central network controller. The controller is responsible for managing the overall functionality of distributed bridging in some embodiments. The central network controller gathers all of the MAC addresses from one of the network segments being bridged. The gathered MAC addresses are then divided into shards of MAC addresses. Each shard is then assigned to a VDRB so the assign VDRB becomes the DB (designated bridge) for the MAC address in the shard. FIG. 5 conceptually illustrates the sharding MAC address by a controller 510 of the network 100. Specifically, the network controller 510 gathers all MAC addresses in the overlay logical network VXLAN100 from the host machines 181-184 in the network 100, divides the gathered MAC addresses into the shards 201-203, and assign each shard to a VDRB operated by a host machine. FIG. 5 conceptually illustrates this sharding process in three stages 501-503.

At the first stage 501, the central network controller 510 gathers MAC addresses from the host machines 181-184. Though the bridging operations are between VXLAN100 and VLAN10, only MAC addresses of VMs operating in VXLAN100 are reported and collected. Namely, the controller 510 collects MAC addresses M5 and M7 from the host machine 181, M2, M4, M6, and M8 from the host machine 182, M1 from the host machine 183, and M3 and M9 from the host machine 184. The controller in turn generates a table 520 of MAC addresses that includes all of the reported/collected MAC addresses.

In some embodiments, each host machine reports the MAC addresses of its VMs to the controller 510 as its VMs comes on line. The table 520 is in some embodiments a complete list of MAC addresses in VXLAN100. Some embodiments forward this table 520 of MAC addresses to the host machines so the host machines may use the table 520 to determine whether a MAC address belongs to VXLAN100, which is used in some embodiments used to determine if a packet is a bridged packet.

At the second stage 502, the controller 510 divides the collection of MAC addresses in the table 520 into separate shards 201-203. Each MAC address collected by the controller 510 is assigned to exactly one shard. As illustrated in FIG. 5 and in FIG. 2, the shard 201 is assigned MAC addresses M1-M3, the shard 202 is assigned MAC addresses M4-M6, and the shard 203 is assigned MAC addresses M7-M9. Each shard is in turn assigned to one of the host machines in the network 100. Specifically, the host machine 181 is assigned the shard 201 (i.e., MAC addresses M1-M3), the host machine 182 is assigned the shard 202 (i.e., MAC addresses M4-M6), and the host machine 183 is assigned the shard 203 (i.e., the MAC addresses M7-M9). In some embodiments, the entire table 520 of MAC addresses is forwarded as the sharding table to the all of the host machines 181-183, and that each of the host machines learns its own shard assignment from the table 520.

The VDRB of each assigned host machine then becomes the designated bridge (DB) of the MAC addresses in its assigned shard. In other words, the VDRB 171 of the host machine 181 becomes the DB of M1-M3, the VDRB 172 of the host machine 182 becomes the DB of M4-M6, and the VDRB 173 of the host machine 183 becomes the DB of M7-M9. Not all of the host machines are assigned a shard. In this example the host machine 184 is not assigned a shard of MAC addresses and therefore its VDRB would not participate in bridging.

At the third stage 503, the controller 510 remains in communication with the host machines 181-183 after the sharding of MAC addresses. In some embodiments, the communications is for detecting failures in the DBs 171-173 or the controller 510. In some embodiments, if a DB has failed, the controller 510 re-shards the MAC addresses and redistributes the MAC addresses to the DBs that are still alive. In some embodiments, the number of DB instances participating in bridging can grow or shrink dynamically to respond to changing workload. In case of host failure, the workload will be redistributed to other hosts. In some embodiments, the controller initiates resharding whenever it detects an event that requires the MAC addresses to be redistributed among the available DBs, such as when there is a change in the number of available DBs (e.g., a DB has failed, or if a new DB has come on line), or when there is a change in the list of known MAC addresses for bridging (e.g., VMs going off line or on line).

Figure 6:
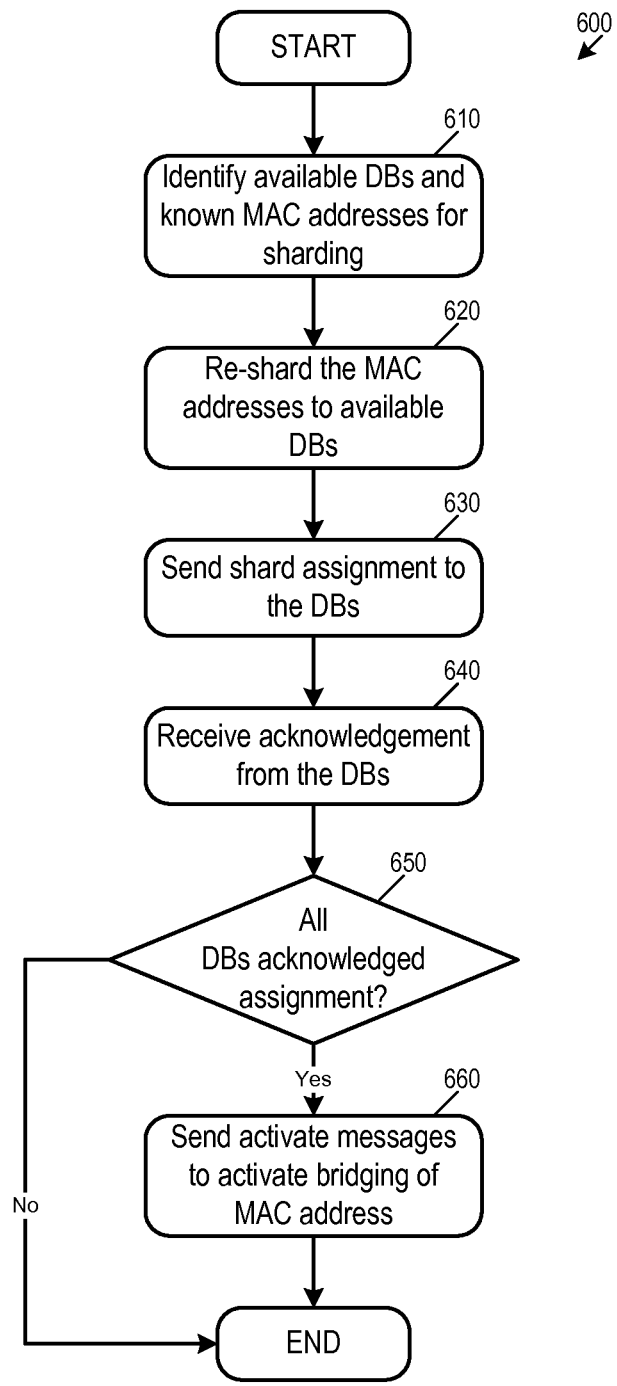
FIG. 6 conceptually illustrates a process for dynamically reassigning MAC addresses to shards due to events that requires resharding.

FIG. 6 conceptually illustrates a process 600 for dynamically reassigning MAC addresses to shards (i.e., re-sharding the MAC address) due to events that requires resharding. In some embodiments, the process 600 is performed by a network controller such as the network controller 510. The process 600 starts when it receives an indication that the number of DBs have changed, or if the list of MAC addresses has changed. Some embodiments determine that there is a lost or failed DB when the heartbeat communication indicates to the controller that one or more of the DBs have failed (i.e., not having heartbeat). Some embodiments determine that there is a change in the number of DBs when receiving commands to add or reduce number of host machine serving as DBs. Some embodiments determine there is a change in the list of MAC addresses to shard when receiving control plane reports from host machines regarding VMs that come on-line or go off-line.

The process 600 identifies (at 610) the available DBs and known MAC addresses for sharding. In the example of FIG. 5, the known MAC addresses are M1-M9 of the overlay logical network VXLAN100, which is divided into shards 201-203 for available DBs 171-173. If a new DB is introduced in addition to the DBs 171-173, or if one of the DBs 171-173 is lost due to failure, the MAC addresses M1-M9 will have to be re-divided among the available DBs. Or, the list of known MAC address has changed, i.e., if one of M1-M9 is lost or if a new VM has come on line for VXLAN100, the list of known MAC addresses would change.

The process 600 then re-shards (at 620) the known MAC addresses, i.e., to reassign or re-divide the known MAC addresses into different shards. In some embodiments, all of the known MAC addresses have to be re-sharded when a change in the number of DB or in the list of known MAC addresses has occurred. In some embodiments, only the MAC addresses assigned to a lost DB and/or MAC address that has newly come on-line need to be re-sharded. The process then assigns each shard to an available DB. In some embodiments, the assignment of address to different shards (and hence to different DBs) is done in order to balance the bridging task loads between the DBs. The sharding assignment is then compiled into a sharding table in some embodiments.

Next, the process sends (at 630) the new shard assignment to the DBs so each DB knows which shard of MAC addresses that is it assigned to handle. Some embodiments do so by sending the sharding table, which includes the entire list of known MAC addresses to the host machines of the DBs along with the sharding assignments as illustrated in FIG. 5 above. The process then receives (640) acknowledgement for the MAC sharding assignment from each of the assigned DBs.

The process then determines (650) if all of the DBs have acknowledged the sharding assignment. For some embodiments, this ensures that all DBs are in sync with regard to the sharding table in some embodiments. If all of the DBs have acknowledged the sharding assignments, the process then sends (at 660) activate messages to the DBs for activating bridging. In some embodiments, each activate message is for activating the bridging of a MAC address at the owner DB of the MAC. The process 600 then ends.

In some embodiments, distributed bridging scheme prevents loops and duplicates between the distributed VDB instances by introducing mechanisms to prevent a bridged packet from being bridged again. In some embodiments, a DB marks a packet that it bridges with a flag to indicate that the packet is a bridged packet, and that no other DB should bridge the packet again. In some embodiments, a DB examines a table to see if the source MAC address is that of a different network segment, and hence a bridged packet that should not be bridged again. FIG. 7a-b illustrate the prevention of bridging loops for some embodiments of the invention.

FIG. 7a illustrates the use of a flag bit to prevent bridging loops in the network 100. The figure illustrates the bridging of a packet 710 from the VM 111 of VLAN10 to the VM 102 of VXLAN100 by the DB 171. The DB 171 sets a bridging flag bit in the bridged packet 711 to prevent bridging loops. The bridging of the packet 710 is illustrated in three operations labeled '1', '2', and '3'.

At the first operation labeled '1', the VM 111 produces the packet 710 in VLAN10 with source MAC address M11 and destination MAC address M2. Since destination MAC address M2 is not known to be in the VNI VLAN10, the packet 710 goes into the DVS sink ports of each host machine.

At the second operation labeled '2', the DB 171 of the host machine 181 accepts the packet 710 for bridging because the DB 171 is assigned the MAC address shard that includes the destination MAC address M2. The DB 171 in turn creates a bridged packet 711 for VXLAN100 based on a lookup of the MAC address M2. The DB 171 also embeds a flag bit "bridged bit" into the bridged packet 711.

At the third operation labeled '3', the bridged packet 711 is encapsulated and injected into the physical network infrastructure 190. The bridged packet 711 reaches the host machine 182 and the destination VM 102 based on the VNI VXLAN100 and the destination MAC address M2. None of the DBs in the network 100 would perform further bridging on the bridged packet 711 (including the DB 172 of the host machine 182) because its flag bit "bridged bit" indicate that the packet 711 has already been bridged and should not be bridged again.

FIG. 7b illustrates the use of a table to prevent bridging loops. Specifically, the table is the table 520 that lists the MAC address in VXLAN100. A DB that receives a packet in VLAN10 can use the table 520 to determine if the source MAC address is in VXLAN100. If so, the packet is a bridged packet from VXLAN100 to VLAN10 and there is no need to bridge again. Likewise, in some embodiments, a DB that receives a packet in VXLAN100 can use the table 520 to determine if the source MAC address is not in VXLAN100 (e.g., VLAN10). If source MAC address is not in the table 520 and therefore not in VXLAN100, the packet is a bridged packet from another segment (i.e., VLAN10) and there is no need to bridge the packet again.

The figure illustrates the bridging of a packet 720 from the VM 105 of VXLAN100 to the VM 111 of VLAN10 by the DB 172. The bridging of the packet 720 is illustrated in three operations labeled '4', '5', and '6'. At the first operation labeled '4', the VM 105 produces the packet 720 in VXLAN100 with source MAC address M5 and destination MAC address M11. The packet is tunneled to "V2", i.e., the host machine (182) operating the DB (DB2 172) that owns the VXLAN100 MAC address M5.

At the second operation labeled '5', the DB 172 of the host machine 182 accepts the packet 720 for bridging because the DB 172 is assigned the MAC address shard that includes the destination MAC address M5. The DB 172 in turn creates a bridged packet 721 for VLAN10 based on a lookup of the MAC address M11. However, unlike bridged VXLAN packets, a bridged VLAN packet in some embodiments does not embed flag bits for indicating that the packet is bridged.

At the third operation labeled '6', the bridged packet 721 is injected into the physical network infrastructure 190. The bridged packet 721 reaches the host machine 183 and the destination VM 111 based on the VNI VLAN10 and the destination MAC address M11. None of the DBs in the network 100 would perform further bridging on the bridged packet 721 (including the DB 173 of the host machine 183) because the source MAC M5 is one of the MAC addresses listed by the VXLAN100 table 520. The inclusion of the source MAC M5 in the table 520 informs the DBs that the packet 721, though a VLAN10 packet, is a bridged packet from VXLAN100 and therefore should not be bridged again lest creating a bridging loop.

Figure 8:
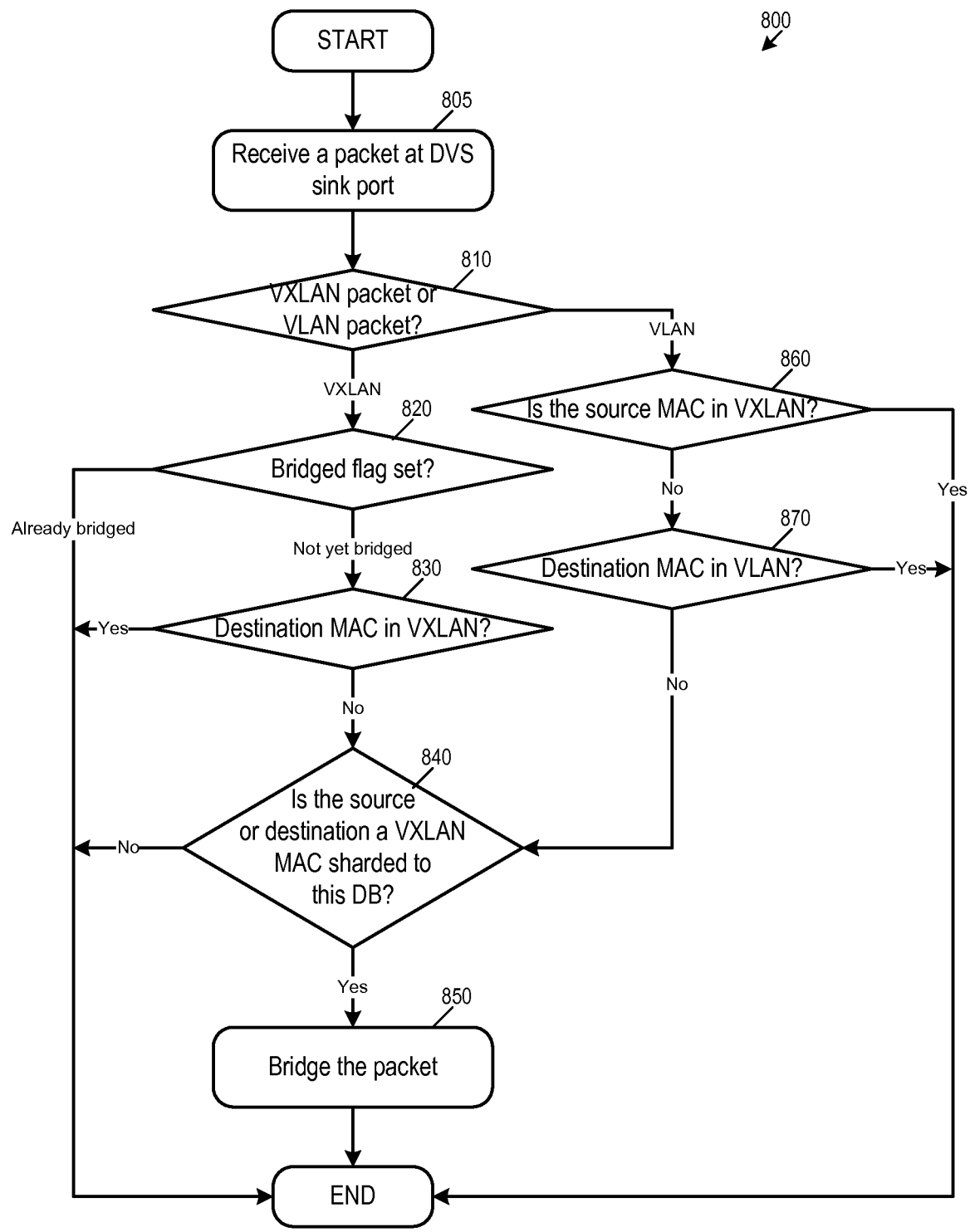
FIG. 8 conceptually illustrates a process performed by a host machine at its VDRB instance.

FIG. 8 conceptually illustrates a process 800 performed by a host machine at its VDRB instance (e.g., the DBs 171-173 of the host machines 181-183) in some embodiments. This process is used for bridging between a physical network segment (such as VLAN) and an overlay logical network (such as VXLAN). The process prevents bridging loops by determining whether a received packet has already been bridged.

The process 800 starts when it receives (at 805) a packet at the sink port of the host machine's DVS. In some embodiments, a packet that potentially needs L3 routing or bridging would have VNI and destination MAC that do not match that of any of the ports of the DVS (or that of any of the VMs of the host machine).

The process then determines (at 810) whether the packet is a VXLAN packet or a VLAN packet. In some embodiments, this is determined by the VNI of the packet. If the packet is a VLAN packet, the process 800 proceeds to 860. If the packet is a VXLAN packet, the process 800 proceeds to 820.

At 820, the process determines whether the packet is a bridged packet by examining whether the VXLAN packet has a flag set indicating that the packet is bridged. If there is a flag indicating the packet has already been bridged, the process 800 ends without bridging the packet. If there is no such flag or if the flag indicates that the packet has not been bridged, the process proceeds to 830. In some embodiments, the process examines a table of VXLAN MAC addresses to determine if the packet is a bridged packet. If the source MAC is not in VXLAN (e.g., not in the VXLAN100 table 520), then it is a bridge packet from another network segment to VXLAN and the process 800 ends. Otherwise the process proceeds to 830.

At 830, the process determines if the destination MAC address is in VXLAN. Since the process at this point has determined that the packet to be a VXLAN packet, a destination MAC address that is also in VXLAN would not require bridging. If the destination MAC is in VXLAN, the process 800 ends without bridging. If the destination MAC is not in VXLAN, the process proceeds 840.

At 840, the process determines whether the source or destination MAC address is a VXLAN address that is sharded to this DB. If neither the source nor the destination MAC address is included in the shard of MAC addresses assigned to this DB, the process 800 ends without bridging the packet. If either the source or the destination MAC address is included in the shard of MAC addresses assigned to this DB, the process proceeds to 850.

At 850, the process bridges packet. In some embodiments, the process uses the destination MAC address to look up a matching VNI. The process then creates a bridged packet based on the incoming packet for the for the network segment as indicated by the matching VNI. After creating the bridged packet and sending it to the DVS of the host machine (which may forward the bridged packet to one of the VMs in the host machine or out to the physical network), the process 800 ends.

At 860, the process determines if the source MAC is in VXLAN in order to determine if the incoming packet has already been bridged. At this point of the process 800, the process has determined that incoming packet is a VLAN packet. A source MAC address that belongs to VXLAN would indicate that the packet is a bridged packet that should not be bridged again. In some embodiments, the process has access to a table of the MAC addresses in the VXLAN (such as the VXLAN100 table 520) that allows it to determine if the source MAC address is in VXLAN. If the source MAC address is in VXLAN, the process 800 ends without bridging the packet. If the source MAC address is not in VXLAN, the process proceeds to 870.

At 870, the process determines if the destination MAC address is in VLAN. At this point of the process 800, the process has determined that the incoming packet is a VLAN packet. Therefore a packet with destination MAC address that is also in VLAN should not be bridged. If the destination MAC address is not also in VLAN, the process proceeds to 840. If the destination MAC address is also in VLAN, the process 800 ends without bridging the packet.

II. Identifying a Bridge in a Remote Host Machine

As mentioned, in some embodiments, the bridging tasks of a network is partitioned based on MAC address such that each designated bridge (DB) is responsible for a shard of MAC addresses. Hence, in some embodiments, a packet that needs to be bridged must be sent to the DB that owns the shard that includes either the source or the destination MAC address. As shown above by reference to FIG. 3, a VXLAN packet that needs bridging is tunneled to a host machine that is operating the corresponding DB that owns the VXLAN MAC. A host machine in some embodiments therefore identifies a tunnel endpoint (i.e., host machine) that operates the correct DB based on the source MAC address. In some embodiments, each host machine is provided a table by the central network controller detailing which DB in which host machine owns which shard of MAC addresses. In some embodiments, a host machine learns the sharding information on its own without the controller provided table based on packets that it has received from the physical network infrastructure. The host machine in turn uses the learned information to identify the DBs that should be used for bridging its outgoing packets.

Figure 9:
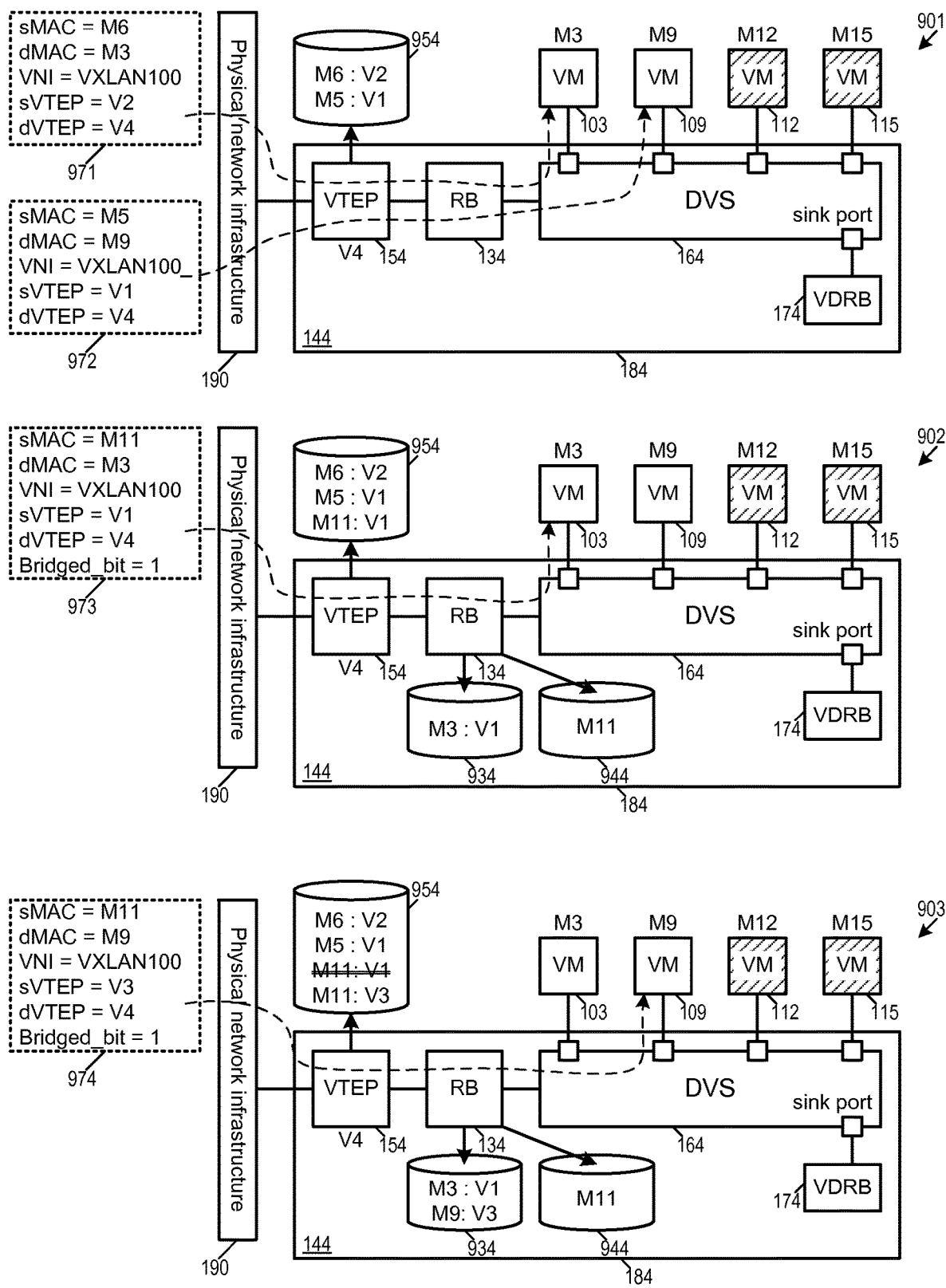
FIG. 9 illustrates the learning of MAC address sharding by a host machine for the purpose of identifying DBs for bridging its outgoing packets.

FIG. 9 illustrates the learning of MAC address sharding by a host machine for the purpose of identifying DBs for bridging its outgoing packets. Specifically, FIG. 9 illustrates the learning by the host machine 184 from incoming packets received from the physical network infrastructure 190. As mentioned by reference to FIG. 1, the host machine 184 is hosting VXLAN100 VMs 103 and 109. Its virtualization software 144 includes the DVS 164, the VTEP 154, and the VDRB 174. In addition, the DVS 164 includes a remote bridging module 134 (RB) for recording and accumulating information used for identifying DBs for bridging. The VDRB 174 is not assigned a shard and is therefore not a DB for the network 100. The figure illustrates the learning process in three stages 901-903.

At the first stage 901, the host machine 184 receives packets 971-972 that were not bridged. The packets 971 and 972 are VXLAN packets that do not have flags that indicate that the packet was bridged. In some embodiments, for each incoming VXLAN packet, the host machines associates the source MAC address and the source tunnel address and learns the association so the host machine would know which tunnel address to use when sending an encapsulated packet back to the source MAC address. As illustrated, for the packet 971, the source MAC is M6 and the source tunnel address is V2, the VTEP module 154 thus records an association between M6 and V2 in a VM-identification table 954. Likewise, for the packet 972, the source MAC is M5 and the source tunnel address is V1, the VTEP module 154 thus records an association between M5 and V1. Each MAC-tunnel address pair stored in the VM-identification table 954 can be subsequently used to identify the tunnel address of the host machine that hosts the VM with the MAC address.

At the second stage 902, the host machine 184 receives a third packet 973. The source MAC of the packet is M11 and the source tunnel address of the packet is V1. The VTEP module 154 in turn stores the pairing of M11 and V1 in the VM-identification table 954. However, the packet 973 is a VXLAN packet that has a bridged flag set to indicate that it is a bridged packet from another network segment (i.e., VLAN10). In some embodiments, the host machine learns the pairing between the destination MAC address (if in VXLAN100) and the source tunnel address in order to determine which DB is assigned the shard that includes the destination MAC address. For the bridged packet 973, the source tunnel address is V1 and the destination MAC is M3, one can thus infer that the MAC address M3 is in a shard that is assigned to the DB in the host machine with tunnel address V1. Consequently, the RB module 134 stores the pairing of M3 and V1 in a bridge identification table 934. Furthermore, since packet is bridged, the host machine is able to determine that source MAC M11 of the bridged packet 973 is not a VXLAN100 address. The RB module 134 therefore stores the MAC address M11 in a bridging table 944 for storing MAC address that are known to be in another network segment (e.g., VLAN10).

At the third stage 903, the host machine 184 receives a fourth packet 974, which is also a bridged packet. Like the previous packet 973, the source MAC of the packet is also M11, but the source tunnel address of the packet is V3 rather than V1. The VTEP module 154 in turn stores the pairing of M11 and V3 in the VM identification table 954, overriding the previously stored pairing of M11 with V1. This is because destination MAC of the packet 973 is M9, which is in a shard that is assigned to the DB 173 (in host machine 183 with tunnel address V3), while the destination MAC of the previous packet 972 is M3, which is in a shard that is assigned to the DB 171 (in host machine 181 with tunnel address V1). Since the bridged flag is set, the RB module 134 stores the pairing of M9 and V3 in the bridge identification table 934.

In some embodiments, the RB module represents a collection of functions that are performed by the virtualization software for the purpose of identifying DB. Although the RB module 134 is illustrated as being situated at the uplink of the DVS 164, some embodiments perform the RB functions at places in the virtualization software other than the uplink.

Figure 10:
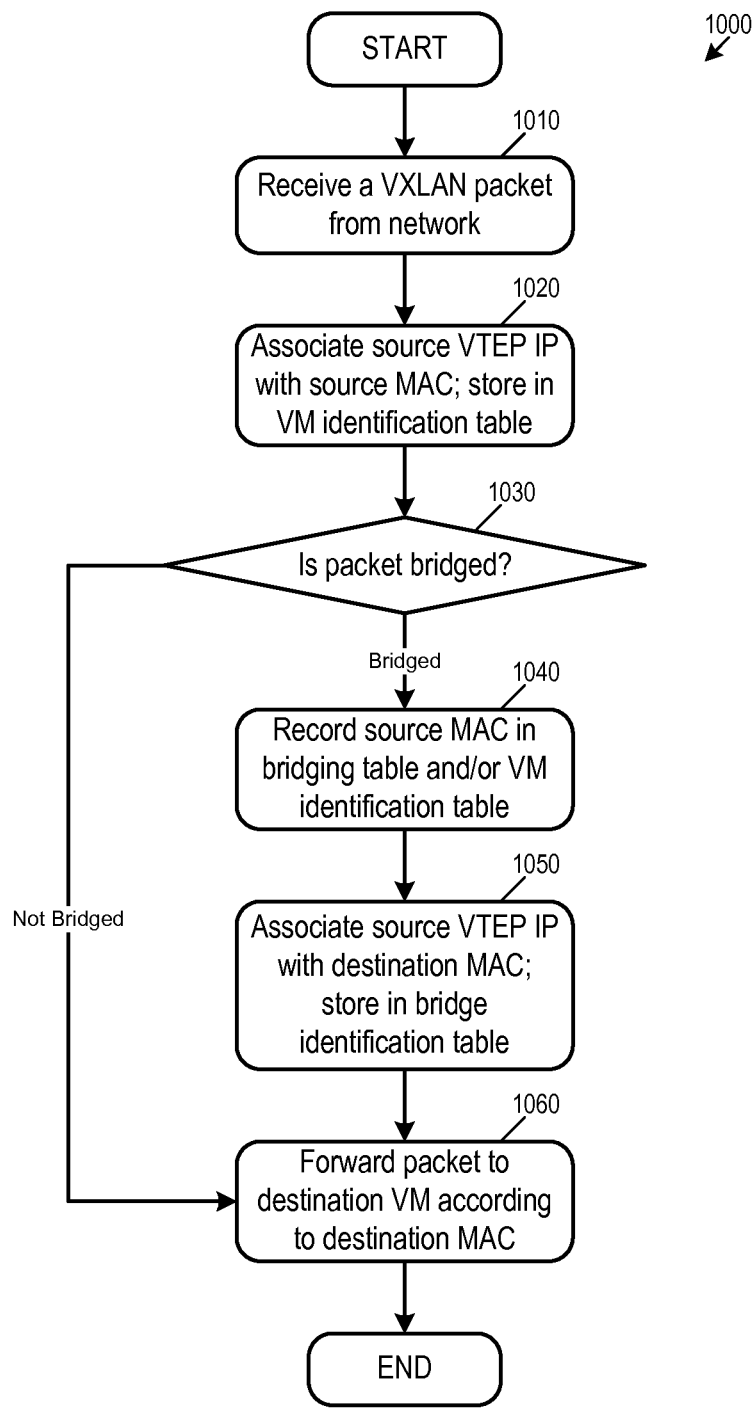
FIG. 10 conceptually illustrates a process for learning information from incoming packets in order to identify the DBs for bridging outgoing packets.

FIG. 10 conceptually illustrates a process 1000 for learning information from incoming packets in order to identify the DBs for bridging outgoing packets. Specifically, the process learns by associating destination MAC addresses with source tunnel addresses of incoming bridged packets. In some embodiments, the process 1000 is performed by a host machine (and its RB module) such as the host machine 184 for populating the VM identification table 954 and the bridge identification table 934.

The process 1000 starts when it receives (at 1010) a VXLAN packet from the network. The process then associates (at 1020) the source tunnel address (i.e., the source VTEP IP) with the source MAC address and stores the associated pair in the VM-identification table. The association of MAC address and tunnel address is used for identifying destination endpoints for outgoing packets that do not need to be bridged.

The process then determines (at 1030) if the received packet is bridged. As mentioned, in some embodiments, a VXLAN packet is accompanied by a flag bit to indicate whether it is a bridged packet (such as the bridged bit in the packet 973). If the packet is not a bridged packet (e.g., not having the bridged flag set), the process proceeds to 1060. If the packet is a bridged packet, the process proceeds to 1040.

At 1040, the process records the source MAC address in a bridging table (such as the table 944) and or a VM identification table (such as the table 954). Since the packet is bridged, its MAC address is necessarily from a network segment that is different from the VXLAN of the packet (e.g., VLAN10). Any future outgoing packet having a destination MAC that is found in the bridging table is a packet that needs to be bridged. Keeping this information in the VM identification in addition to the bridging table also allow the RB to know that a destination MAC is on the VLAN side without consulting the bridging table. The RB in some of these embodiments would consult the bridging table only when the destination MAC needs to be bridged.

Next, the process associates (at 1050) the source tunnel address with the destination MAC address. The associated tunnel address and MAC address are then stored as a pair in the bridge identification table. Since this packet is a bridged packet, its source tunnel address (or VTEP IP) is that of the DB that owns the shard of the VXLAN MAC of the current incoming packet. Any future outgoing packet having the same VXLAN MAC, if need to be bridged, would have to go to the same DB for bridging. The bridging identification table would then be used to identify the DB for the outgoing packet.

The process then forwards (at 1060) the packet to the destination VM according its destination MAC. In some embodiments, this is performed by the DVS of the host machine. The process 1000 then ends.

FIG. 10 illustrates a process in which the association between the source VTEP IP and the source MAC is always recorded regardless of whether the incoming packet is bridged. In some embodiments, the process only records the association between the source VTEP IP with the source MAC when the incoming packet is not bridged. (In other words, operations 1010 and 1020 are performed only after the operation 1030 has determined that the packet is not bridged).

Figure 11:
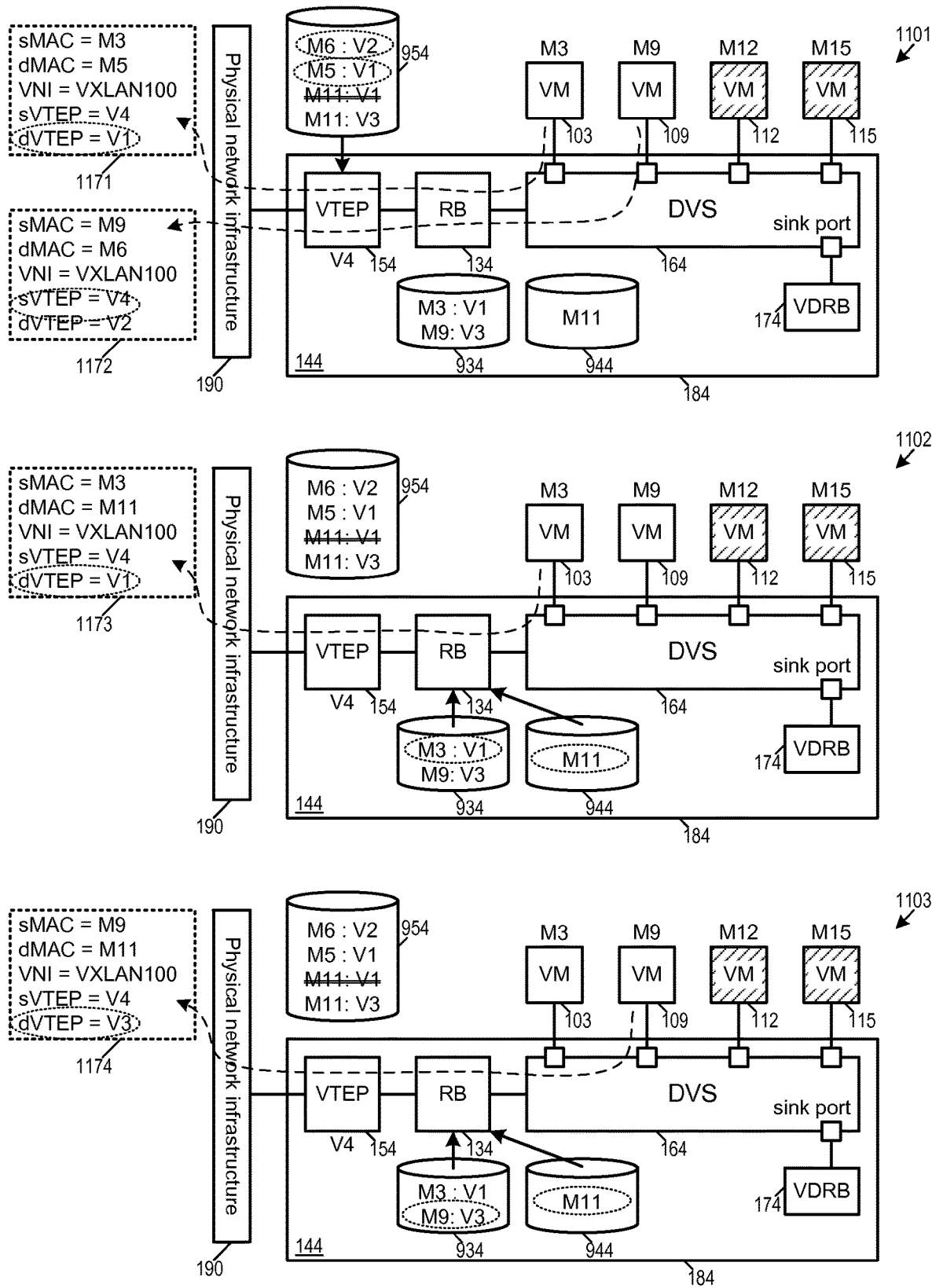
FIG. 11 illustrates using the learned MAC-VTEP pairing to identify destination tunnel address for outgoing packets, including both outgoing packets that need to be bridged and outgoing packets that need not be bridged.

FIG. 11 illustrates using the learned MAC-VTEP pairing to identify destination tunnel address for outgoing packets, including both outgoing packets that need to be bridged and outgoing packets that need not be bridged. In three stages 1101-1103, FIG. 11 illustrates the transmission of packets 1171-1174 by the host machine 184 using the learned information stored in the tables 954, 934, and 944 at the end of stage 903 of FIG. 9. The packets 1171-1174 are all VXLAN packets that need to be delivered by VXLAN tunnel, which requires knowing destination tunnel address. For packets that are destined for MAC address in VXLAN (i.e., no need for bridging), the destination tunnel address is identified by the previously learned pairing between MAC address and tunnel address stored in the VM-identification table 954. For packets that are destined for MAC addresses in VLAN and hence requiring bridging, the destination tunnel address is identified by the previously learned pairing between MAC address and tunnel address stored in the bridge identification table 934, which is used to identify the DB that should be used for bridging the outgoing packet. The host machine 184 also uses the information stored in the bridging table 944 to determine whether a destination MAC address requires bridging.

At the stage 1101, the host machine 184 is sending the packet 1171 and the packet 1172. For the packet 1171, the destination MAC is M5, which is associated with the tunnel address V1 according to the VM-identification table 954. The VTEP module 154 therefore sets the destination tunnel address to V1. For the packet 1172, the destination MAC is M6, which is associated with the tunnel address V1 according to the VM-identification table 954. The VTEP module 154 therefore sets the destination tunnel address to V2. Since the destination MAC addresses are not identified to be in VLAN (e.g., by using the bridging table 944), the packets will not be bridged, and the bridge identification table 934 is not used to identify the DB for bridging.

At the stage 1102, the host machine 184 is sending the packet 1173. For the packet 1173, the source MAC is M3, and the destination MAC is M11. The destination M11 is identified as requiring bridging by the bridging table 944. The RB module 134 in turn uses the bridge identification table 934 to identify the DB that should be used for the bridging. As mentioned, the sharding of MAC addresses to DBs is based on VXLAN100 MAC addresses rather than VLAN10 MAC addresses, the source MAC M3 (a VXLAN100 MAC) is therefore used to identifying the DB to be used. According to the bridge identification table 934, the MAC address M3 is bridged by the DB behind the tunnel address V1 (i.e., the host machine 181). The RB module 134 therefore sets the destination tunnel address of the packet 1173 to V1. The MAC-VTEP pairing information stored in the table 954 is not used to set the destination tunnel address based on the destination MAC address M11.

At the stage 1103, the host machine 184 is sending the packet 1174. For the packet 1174, the source MAC is M9, and the destination MAC is M11. Since M11 is identified as requiring bridging by the table 944, the packet 1173 will have to be bridged. The RB module 134 again uses the bridge identification table 934 to identify the DB that should be used for the bridging based on the source MAC M9 (a VXLAN100 MAC). According to the bridge identification table 934, the MAC address M9 is bridged by the DB behind the tunnel address V3 (i.e., the host machine 183). The RB module 134 therefore sets the destination tunnel address of the packet 1173 to V3. The MAC-VTEP pairing information stored in the VM identification table 954 is not used to set the destination tunnel address based on the destination MAC address M11 (otherwise packet would be tunneled to the wrong destination endpoint with the wrong DB that does not own the shard of the VXLAN MAC address).

FIGS. 12*a-b* illustrate the bridging of the packets 1173 and 1174 by their correspondingly identified DBs. Specifically, FIG. 12*a* illustrates the bridging of the packet 1173 during the stages 1102 of FIG. 11, and FIG. 12*b* illustrates the bridging of the packet 1174 during the stage 1103 of FIG. 11.

FIG. 12*a* illustrates the host machine 184 using its RB module 134 to identify the DB that should be used for bridging the packet 1173. The RB module 134 identifies that the DB (171) behind the tunnel address V1 (of the host machine 181) is the DB owning the shard that includes M3 (the source MAC address of the packet 1173). The packet 1173 is then tunneled to the host machine 181, whose DB 171 bridges the packet 1173 to VLAN10 based on its destination MAC M11. The bridged packet 1273 then reaches destination VM 111 based on the VNI VLAN10 and the destination MAC M11.

FIG. 12*b* illustrates the host machine 184 using its RB module 134 to identify the DB that should be used for bridging the packet 1173. The RB module 134 identifies that the DB (173) behind the tunnel address V3 (of the host machine 183) is the DB owning the shard that includes M9 (the source MAC address of the packet 1174). The packet 1174 is then tunneled to the host machine 183, whose DB 173 then bridges the packet 1174 to VLAN10 based on its destination MAC M11. The bridged packet 1274 then reaches destination VM 111 based on the VNI VLAN10 and the destination MAC M11. It is worth noting that even though the packet 1173 and 1174 share the same destination MAC address (M11), they are bridged by different DBs because they have different source MAC addresses that are sharded to different DBs.

Figure 13:
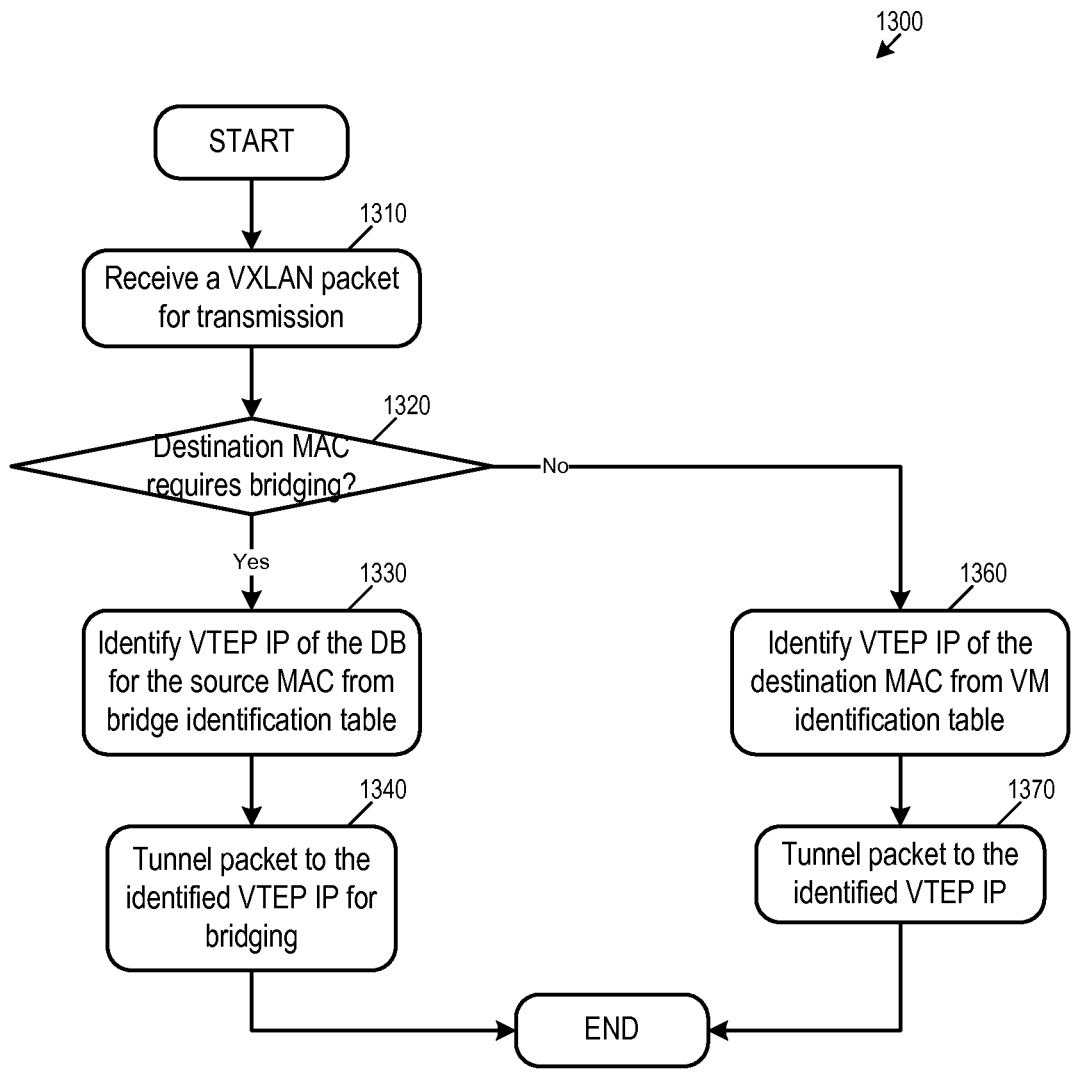
FIG. 13 conceptually illustrates a process for identifying the DB for bridging an outgoing packet.

For some embodiments, FIG. 13 conceptually illustrates a process 1300 for identifying the DB for bridging an outgoing packet. Specifically, the process uses information learned from incoming packets (by e.g., using the process 1000) for identifying the tunnel address (or VTEP IP) of the DB. In some embodiments, the process is performed by a host machine (and its RB module) such as the host machine 184, which uses information stored in a bridging table (such as the table 944) and the bridge identification table (such as the table 934) to identify the tunnel address of the DB.

The process starts when it receives (1310) a packet for transmission from one of the VMs running on the host machine that is in VXLAN. The process then determines (at 1320) whether the destination MAC is one that requires bridging. In some embodiments, the process consults a bridging table (such as the learned bridging table 944) to determine if the destination MAC of the packet is in another network segment (e.g., VLAN). If the destination MAC is a MAC that requires the packet to be bridged, the process proceeds to 1330. Otherwise, the process proceeds to 1360.

At 1330, the process identifies the VTEP IP (or the tunnel address) of the DB that is assigned to bridge this packet, i.e., the DB that owns the shard of MAC addresses that includes the source MAC of the packet (which is necessarily a VXLAN MAC). Some embodiments use the source MAC of the packet to look up a VTEP IP in the bridge identification table (e.g., the table 934), which is the VTEP IP of the host machine that operates the DB assigned to bridge the packet with the source MAC (based on previously learning). In some embodiments, if the process is not be able to identify the DB for the source MAC based on the previously learned information, the process would query the controller for the VTEP IP or flood the network with the destination MAC and wait for a reply from the tunnel endpoint bearing the VTEP IP of the DB. Flooding the network with destination MAC for identifying a DB will be further described by reference to FIG. 14 below.

The process then tunnels (at 1340) the packet to the identified VTEP IP for the packet to be bridged by the DB. The process 1300 then ends.

At 1360, the process identifies the VTEP IP of the destination MAC from the VM identification table. At this point of the process 1300, the process has determined that the destination MAC of the packet is in the same network segment as the VXLAN and would not require bridging. The process therefore only need to identify the VTEP IP of the host machine that is hosting the VM bearing the destination MAC address. In some embodiments, the process uses the destination address to look up a corresponding VTEP IP in the VM identification table (e.g. the table 954), which stores previously learned pairings of VM MAC addresses and their host's VTEP IP. In some embodiments, if the process is not be able to identify the corresponding VTEP IP for the destination MAC based on the previously learned information, the process would query the controller for the VTEP IP or flood the network with the destination MAC and wait for a reply from the tunnel endpoint hosting the VM with the destination MAC.

The process then tunnels (at 1370) the packet to the identified VTEP IP in order to reach the VM of the destination MAC address. The process 1300 then ends.

As mentioned, to bridge a packet from VXLAN to VLAN in some embodiments requires the sender to first tunnel the VXLAN packet to the host machine having the corresponding DB for the VXLAN MAC. This requires the sender host machine to know the VTEP IP of tunnel address of the DB. FIGS. 9-10 describes using incoming bridged packets to learn the VTEP IP of the DB that is paired with a given MAC address (i.e., the DB that owns the VXLAN MAC). However, in some embodiments, a host machine sometimes have to send a VXLAN packet to be bridged without having already learned the VTEP IP of the corresponding DB. In some embodiments, the host machine queries the network central controller for the VTEP IP of the unknown DB. In some embodiments, the host machine floods the network with a BUM (broadcast, unknown uncast, or multicast) packet in order to find out the VTEP IP of the unknown DB.

Figure 14:
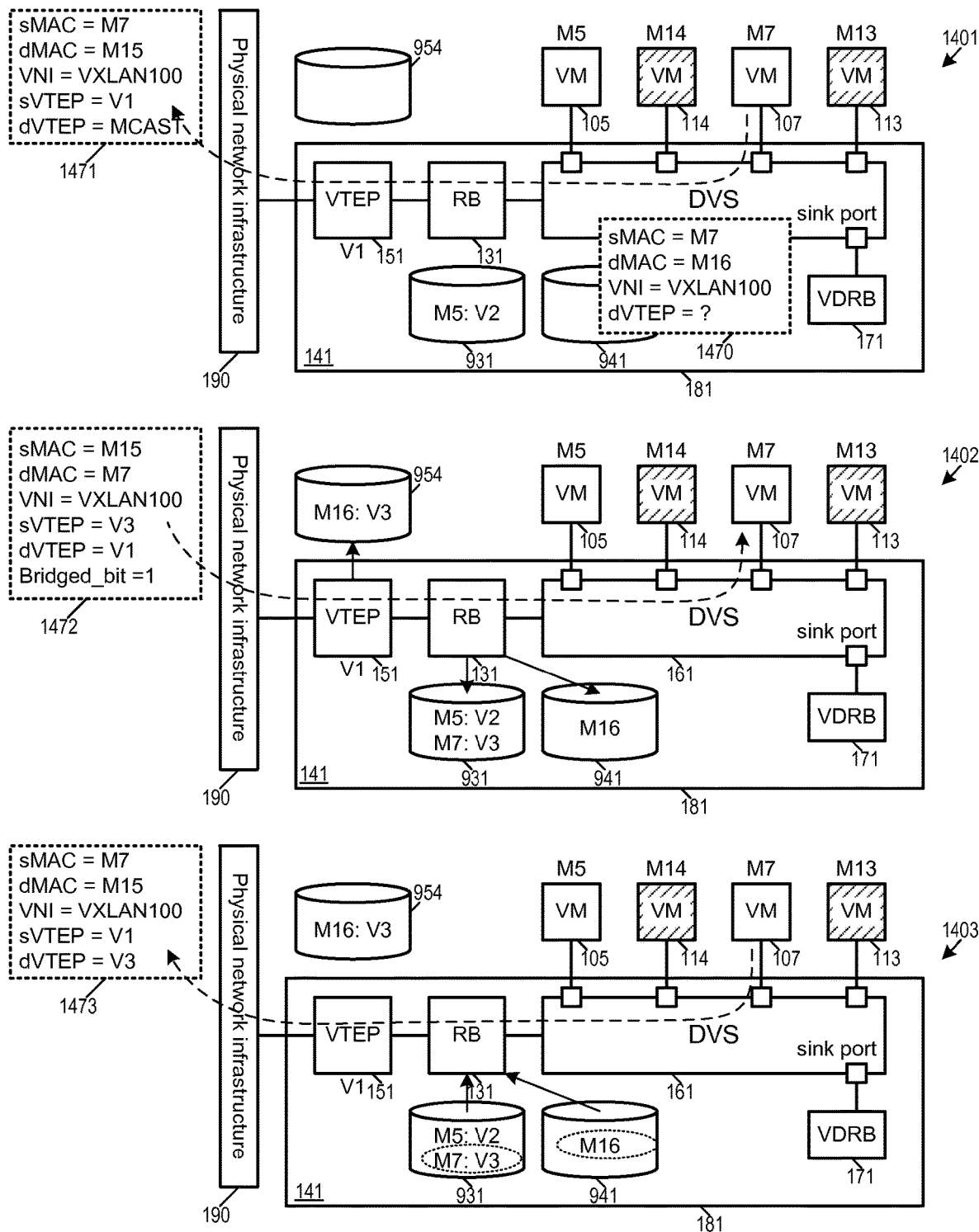
FIG. 14 illustrates using BUM packet for identifying the assigned DB that is assigned to a given VXLAN address.

FIG. 14 illustrates using BUM packet for identifying the DB that is assigned to a given VXLAN address. The figure illustrates the transmission of a packet 1470 from MAC M7 (VM 107) of the host machine 181 to a destination MAC M15. The VM 107 is connected to the overlay logical network VXLAN100. However, it is unknown as to whether the destination MAC M15 belongs to another VNI (e.g., VLAN10). It is also unknown to the host machine 181 as to which DB owns the VXLAN address M7 and therefore tasked to bridge a packet from the VM 107. The figure illustrates the use of a BUM packet to learn the identity of the DB for MAC address M7 by the host machine 181 in three stages 1401-1403.

At the first stage 1401, the VM 107 generates the packet 1470, whose source MAC is M7 and destination MAC is M15. The destination MAC M15 has no corresponding entry in a bridging table 941 of the host machine 181, so it is unknown whether the packet 1470 requires bridging. Furthermore, the source MAC M7 has no corresponding entry in the bridge identification table 934, so it is unknown as to which DB (and its corresponding VTEP IP) owns the MAC M7 and therefore tasked to bridge the packet 970. In order to deliver the packet 1470 to its destination M15, the host machine 181 floods the physical network infrastructure 190 with a BUM packet 1471.

The BUM packet 1471 has the same source and destination MAC addresses as the packet 1470 generated by the source VM 107 (i.e., M7 and M15). In addition, it is an encapsulated packet in VXLAN100 that specifies a multicast group ID as destination VTEP IP. In some embodiments, a multicast group is a group of host machines that subscribe to a particular multicast group ID, where all of the host machines in the multicast group would receive the packets bearing the multicast group ID. In some embodiments, all host machines having VMs in a particular VNI (e.g., VXLAN100) subscribe to a same multicast group ID such that the multicast group ID can be used to broadcast a packet to all host machines in the VNI.

At the second stage 1402, the host machine 181 receives a reply packet 1472 from the physical network infrastructure 190. The reply packet 1472 is from M15, in response to the BUM packet 1471. The reply packet 1472 is also a bridged packet (e.g., having the bridged bit set) that comes from VTEP IP "V3". In other words, this V3 is the VTEP IP of the DB that bridged the packet 1472. The destination MAC of the bridged packet 1472 is VXLAN MAC M7, therefore one can infer that V3 is the DB that owns the MAC address M7. As illustrated, the bridge identification table 931 learns the association between the MAC address M7 and its DB V3. The bridging table 941 also learns that the MAC address M15 is from a VNI that requires bridging (i.e. not VXLAN100).

At the third stage 1403, the VM 107 (M7) sends another packet 1473 to M15. However, since the host machine already knows that M15 is not on VXLAN100 (hence needs bridging) and that the DB of the MAC address M7 is at the tunnel address V3 (from the bridge identification table 931), the host machine hence encapsulate the packet 1473 with destination VTEP of V3 so the packet 1473 will be tunneled to the correct DB.

FIG. 15a illustrates the bridging of the BUM packet 1471 from its source in VXLAN to its destination in VLAN. The figure correspond to the stage 1401 of FIG. 14, in which the DB that owns the VXLAN MAC of the BUM packet 1471 picks up the BUM packet from VXLAN100 and bridges it over to VLAN10, even though the sender of the BUM packet 1471 does not know to which DB should the packet be sent to be bridged. FIG. 15a illustrates the bridging of the BUM packet 1471 in three operations labeled '1' through '3'.

At the first operation labeled '1', the host machine 181 floods the physical network infrastructure 190 by sending the BUM packet 1471. The BUM packet 1471 specifies that it is from source MAC M7 to destination MAC M16 with a multicast group ID as the destination VTEP. The host machine 181 floods the network because it does not know to how to reach the destination MAC M16.

At the second operation labeled '2', the BUM packet 1471 reaches all of the host machine or tunnel endpoints in the multicast group (i.e., those tunnel endpoints that accepts the multicast group ID). The BUM packet 1471 ends up on sink port of all of the host machines as its destination MAC (M15) and VNI (VXLAN100) does not match any port. However, only the DB 173 in the host machine 183 (VTEP IP V3) accepts the BUM packet 1471 for bridging, since it is the owner of the MAC address shard that includes M7, the VXLAN address in the packet 1471. Though not illustrated, the host machine 183 also learns that the MAC address M7 is from the VTEP IP V1 so the it would know to tunnel to VTEP IP V1 in order to reach M7 in the future. This learning is described by reference to FIGS. 9 and 10 above.

At the third operation labeled '3', the DB of the host machine 183 bridges the packet 1471 and creates a bridged packet 1571 for the VLAN10, in which the source MAC is M7 and the destination MAC is M15. The bridged packet 1571 then follows the VNI and the destination MAC (M15, VLAN10) to reach the VM 115 of the host machine 184.

FIG. 15b illustrates the bridging of the reply packet 1472 from VLAN back to VXLAN. The figure corresponds to the stage 1402 of FIG. 14, in which the VM 115 of the host machine 184 sends the reply packet 1472 in response to the BUM packet 1471. FIG. 15b illustrates the bridging of the reply packet 1472 in three operations labeled '4' through '6'.

At the first operation labeled '4', the VM 115 of the host machine 184 sends a reply packet 1572 in response to the bridged packet 1571. The reply packet is a VLAN10 packet destined for the MAC address M7, i.e., the original sender of the BUM packet 1471 (and hence the bridged packet 1571).

At the second operation labeled '5', the reply packet 1572 with destination MAC M7 is accepted by the DB 173 of the host machine 183 for bridging, since the DB 173 of the host machine 183 owns the MAC address M7. The DB 173 had earlier also bridged the BUM packet 1471. This is because the destination MAC M7 of the reply packet 1472 is the same as the source MAC M7 of the BUM packet 1471, which is in a shard owned by the DB 173. Consequently, upon receipt of the reply packet 1472, the host machine 181 (i.e., the sender of the BUM packet 1471) will be able to learn the identity or the VTEP IP of the DB that is tasked to bridge packets with VXLAN MAC M7.

At the third operation labeled '6', the DB 173 of the host machine 183 bridges the packet 1572 and creates the bridged packet 1472 for the VXLAN100. The DB 173 tunnels the bridged packet 1472 to the host machine 181 (VTEP IP V1) for the destination MAC M7. The host machine 183 knows to tunnel to the host machine 181 for the MAC address M7 because it had learned pairing between the VTEP IP V1 and the MAC address M7 when it receives the BUM packet 1471 at the operation '2' as described above.

FIG. 15a-b illustrates the bridging of BUM packets that originates from VXLAN, in which the DB that owns the VXLAN address of the BUM packet is tasked to bridge the BUM packet. In some embodiments, DBs also handles the bridging of BUM packets from VLAN. In some embodiments, one DB is chosen to handle the bridging of all BUM packets from VLAN. The chosen DB would flood the VXLAN with the bridged packet from VLAN. In some embodiments, different DBs are chosen to handle different multicast groups, and one of the DBs is chosen to handle broadcast.

In some embodiments, the physical network infrastructure includes multiple clusters of host machines, each cluster of host machines implemented over one L2 segment in the physical network infrastructure. In some embodiments, a physical network segment (such as VLAN) corresponds to a L2 segment (or IP subnet) of the physical network infrastructure, and an overlay logical network (such as VXLAN) spans multiple L2 segments the physical network infrastructure. In some of these embodiments, DBs are primarily deployed in one particular cluster of the physical network infrastructure in which VXLAN and VLAN workload reside on the same L2 segment. RBs are deployed in host machines of all clusters so that the host machines in different clusters can identify the correct DB in the one particular cluster for bridging.

Figure 16:
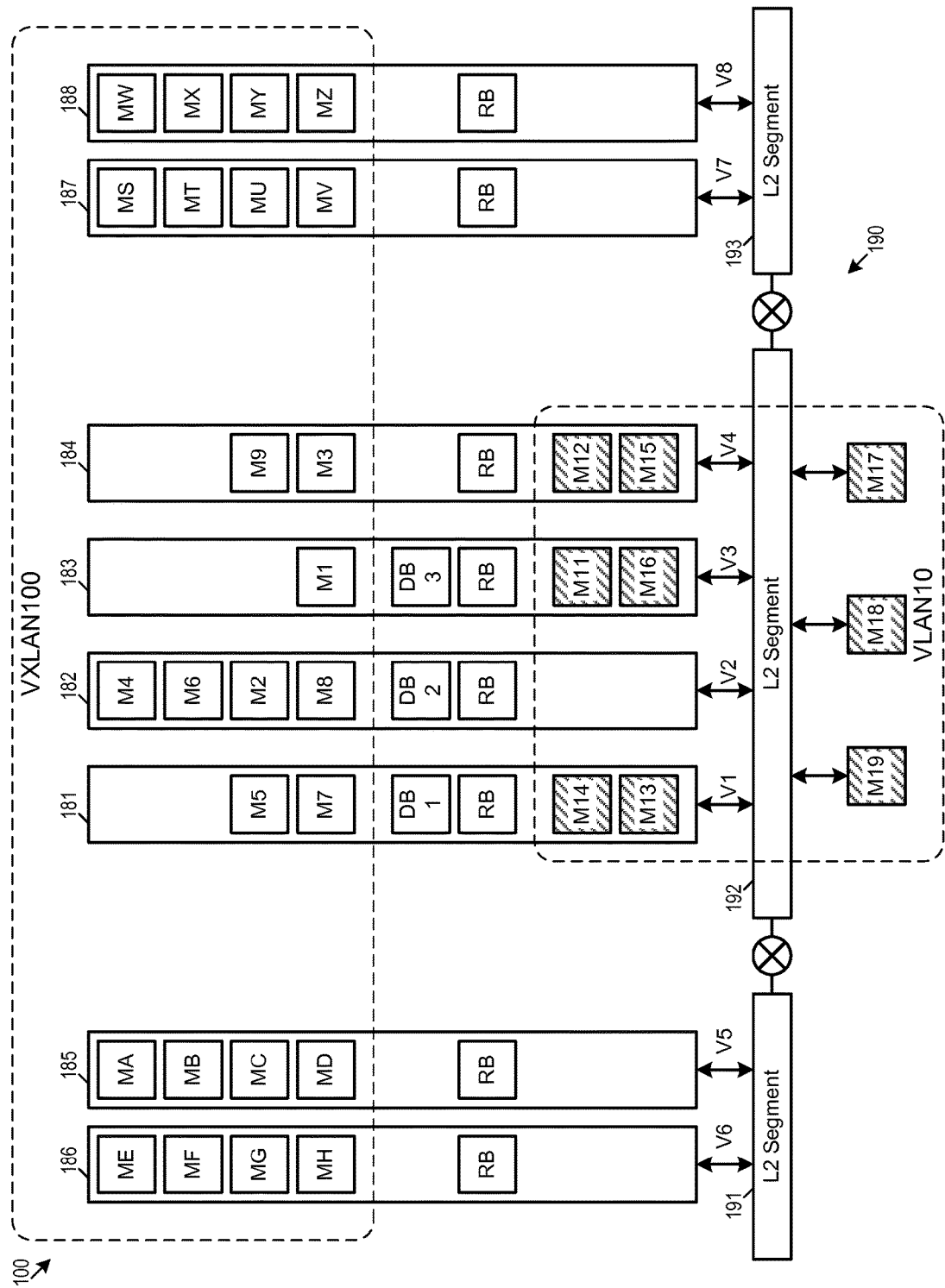
FIG. 16 illustrates a more detail view of the network in which the physical network infrastructure includes multiple clusters of host machines.

FIG. 16 illustrates a more detail view of the network 100 in which the physical network infrastructure 190 includes multiple clusters of host machines. As illustrated, the physical network infrastructure 190 includes three L2 segments 191, 192 and 193, the L2 segments interconnected by L3 routers. Each L2 segment interconnecting (and therefore defining) one cluster of host machines. Specifically, the cluster that corresponds to the L2 segment 191 includes host machines 185-186, the cluster that corresponds to the L2 segment 192 includes the host machines 181-184, the cluster that corresponds to the L2 segment 193 includes the host machines 187-188.

The host machines 185 is operating VMs with MAC addresses "MA", "MB", "MC", and "MD". The host machines 186 is operating VMs with MAC addresses "ME", "MF", "MG", and "MH". The host machine 187 is operating VMs with MAC addresses "MS", "MT", "MU", and "MV".

The host machine 188 is operating VMs with MAC addresses "MW", "MX", "MY", and "MZ". These VMs are all in VXLAN100, in addition to VMs 101-109 (M1-M9). These additional MAC addresses are also sharded to one of the DBs in the host machines 181-183 (i.e., DB 171, DB 172, and DB 173) such that bridging tasks for packets having MAC addresses MA-MH or MS-MZ are partitioned among the DBs of the host machine 181-183.

VXLAN100 is an overlay logical network that spans over xL2 segments 191-193, which includes host machines 181-188. VLAN10 is a physical network segment that is defined by the L2 segment 192, which includes only the host machines 181-184. In other words, VXLAN100 and VLAN10 coexist in one L2 segment 192 and the cluster of host machine 181-184. Within this cluster (defined by L2 segment 192), VMs and PHs of VXLAN100 and VLAN10 share the same IP subnet and packets can be bridged between VLAN10 and VXLAN100.

In some embodiments, DBs for bridging between a particular VXLAN (e.g., VXLAN100) and a particular VLAN (e.g., VLAN10) are instantiated only in an L2 segment or cluster that is shared by both the VXLAN and the VLAN. In the network 100, only the VDRBs of the host machines in the L2 segment 192 (i.e., host machines 181-183) are configured as DBs. VDRBs in other host machines of other clusters are not configured as DBs between the VXLAN and the VLAN. In some embodiments, the cluster that is shared by the VXLAN and the VLAN is a service cluster for providing communications access to Internet and the outside worlds, while other clusters are compute clusters for performing the bulk of computation tasks.

As mentioned, a RB in a host machine (such as the RB module 134 in the host machine 184) is for identifying the DB that owns a particular VXLAN MAC address. This allows a host machine of VXLAN VMs to be able send an encapsulated packet to the tunnel endpoint that hosts the identified DB, even if the host machine and the DB are in different L2 segments or clusters. As illustrated, all host machine having VMs in VXLAN100 (including those in cluster 191 and 193) have a RB module for tunneling packets to be bridged by the DBs in the cluster 192.

III. Local Bridging

In some embodiments, distributed bridging relies on local bridges (LB) in some of the host machines. A LB of a host machine in some embodiments handles the bridging of packets that are destined to or sourced by VMs running on that host machine. In some embodiments, the LBs in the host machines offload bridging tasks from one or more designated bridges (DB) such that a DB only performs bridging on VXLAN MAC addresses that are not serviced by the LBs in the network. In some embodiments, a DB serves as the default bridge for handling bridging tasks that are not handled by the LBs.

Figure 17:
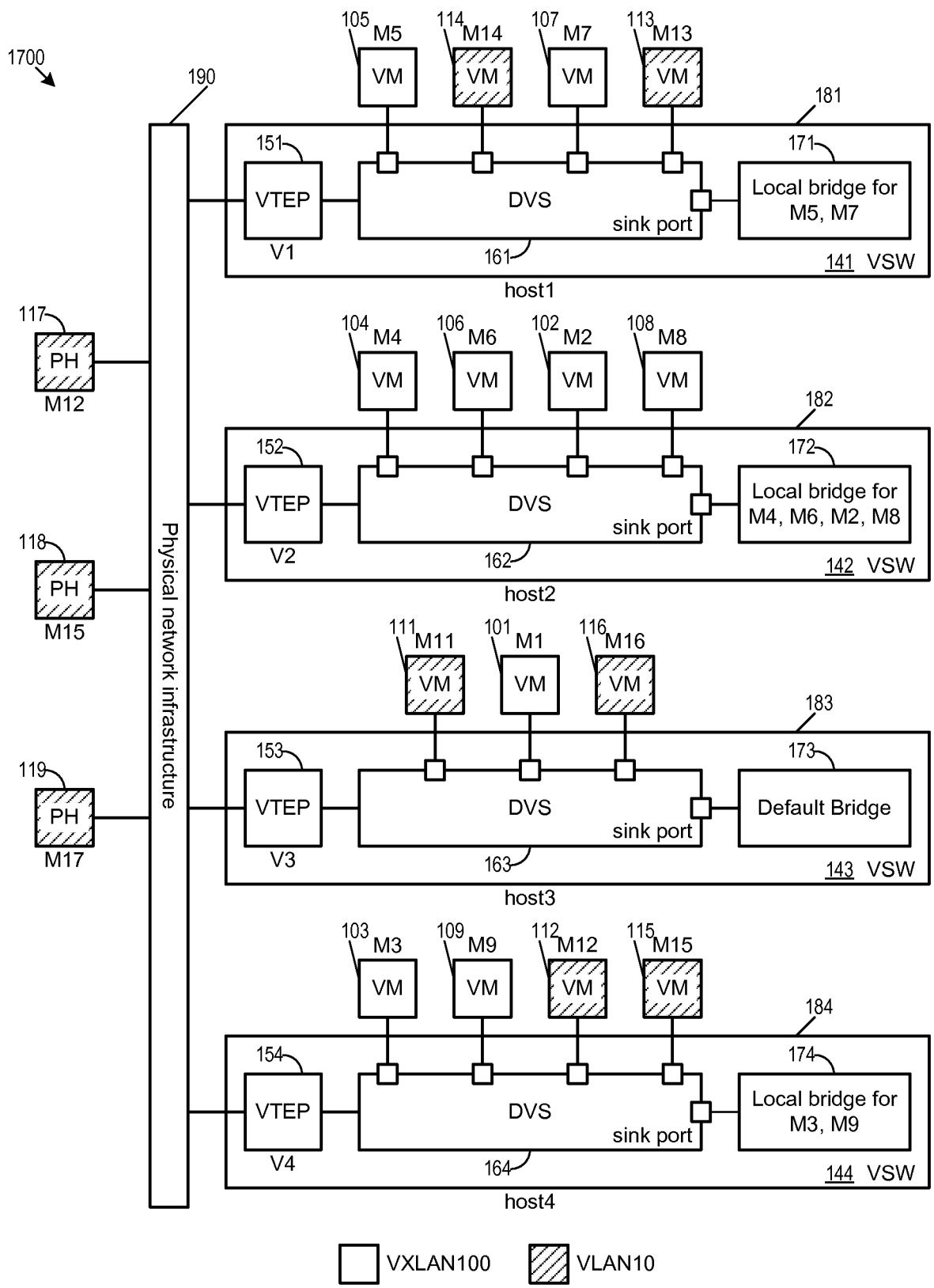
FIG. 17 illustrates a network in which the bridging between a logical overlay network and a physical network segment relies on local bridging by LBs in the host machines.

FIG. 17 illustrates a network 1700 in which the bridging between a logical overlay network and a physical network segment relies on local bridging by LBs in the host machines. The network 1700 is identical to the network 100 in that it is built over the physical network 190 that interlinks the host machines 181-184 and physical hosts 117-119. As in the network 100, the host machines 181-184 are hosting VMs 101-116. Some of the VMs (VMs 101-109) are operating in the overlay logical network VXLAN100. Some of the VMs (VMs 111-116) are operating in the physical network segment VLAN10.

Each of the host machines is operating virtualization software (VSW) that includes a DVS module, a VDRB module that sits at the sink port of the DVS module, and a VTEP module that sits at the uplink of the DVS module. The network 1700 differ with the network 100 in that the VDRB instances 171, 172, and 174 in the host machines 181, 182, and 184 are configured to operate as LBs, while the VDRB instance 173 of the host machine 183 is configured to operate as a default bridge. As in the network 100, the partition of bridging tasks is based on MAC addresses in the overlay logical network (VXLAN100), and hence each LB handles bridging for its local VMs operating in VXLAN100 but not the VMs operating in VLAN10.

As illustrated, VXLAN100 VMs 105 and 107 are local to the host machine 181, so the VDRB 171 (configured as LB) handles the bridging for the MAC address M5 and M7. Likewise, VXLAN100 VMs 104, 106, 102, 108 are local to the host machine 182, so the VDRB 172 handles the bridging for the MAC address M4, M6, M2, and M8. VXLAN100 VMs 103 and 109 are local to the host machine 184, so the VDRB 174 handles the bridging for the MAC address M3 and M9. The VDRB 173 of the host machine 183 is configured as a default bridge. It handles the bridging for all other VXLAN MAC addresses, including the VXLAN MAC address of VMs operated by the host machine 183 (i.e., M1 of the VM 101).

Figure 18A:
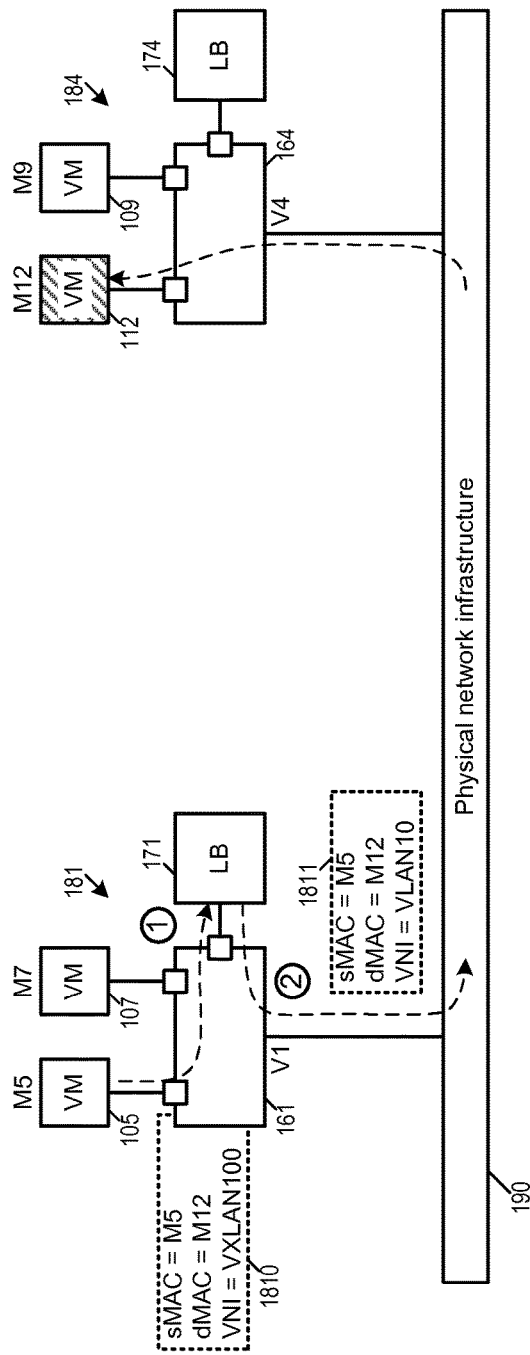
FIGS. 18a-b illustrate using LBs to bridge of packets between VMs in an overlay logical network and VMs in a physical network segment.
Figure 18B:
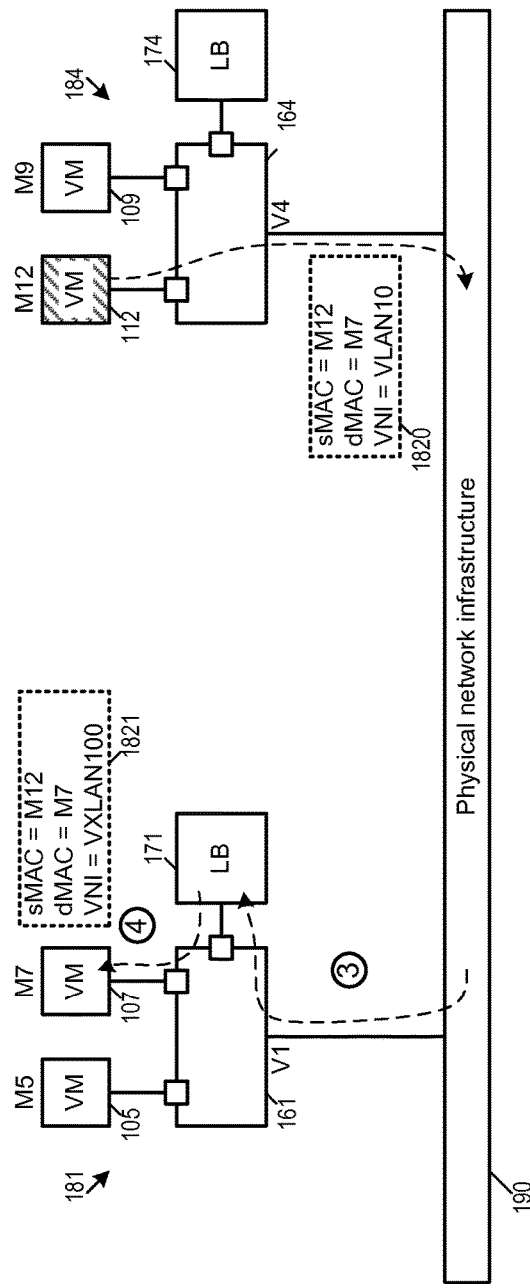

FIGS. 18a-b illustrate using LBs to bridge of packets between VMs in the overlay logical network VXLAN100 and VMs in the physical network segment VLAN10 in the network 1700. These packets are bridged locally by the LBs of the host machines that host VXLAN100 VMs.

FIG. 18a illustrates the bridging of the packet 1810 from the VM 105 (MAC address M5) in VXLAN100 to the VM 112 in VLAN10 (MAC address M12). The bridging is performed by the LB 171 of the host machine 181, which hosts the VM 105. FIG. 18a illustrates the bridging of the packet 1810 in two operations labeled '1' and '2'. At the first operation labeled '1', the VM 105 of the host machine 181 produces the packet 1810 with source MAC address M5 and destination MAC address M12, with VNI of VXLAN100. Since the destination MAC is not in VXLAN100, this packet will have to be bridged. However, since the source MAC address M5 is a VXLAN100 address that is local to the host machine 181, the LB 171 accepts the packet 1810 for bridging.

At the second operation labeled '2', the LB 171 has determined that the destination MAC address M12 is in VLAN10 and produces a bridged packet 1811 with VNI for VLAN10. The bridged packet 1811 is then injected into the physical network infrastructure 190 and reaches the VM 112 in the host machine 184.

FIG. 18b illustrates the bridging of a packet 1820 from the VM 112 to the VM 107 (MAC address M7) in VXLAN100. The bridging is performed by the LB 171 of the host machine 181, which hosts the VM 107. FIG. 18b illustrates the bridging of the packet 1820 in two operations labeled '3' and '4'. At the first operation labeled '3', the VM 112 of the host machine 184 produces the packet 1820 with source MAC address M12 and destination MAC address M7, with VNI of VLAN10. Since the destination MAC is not in VLAN10, this packet will have to be bridged. However, since neither M7 nor M12 is a local VXLAN MAC address of the host machine 184, the LB 174 will not handle the bridging of the packet 1820. Rather, the packet 1820 is injected into physical network infrastructure 190 as a VLAN10 packet destined for M7.

At the second operation labeled '4', the LB 171 of the host machine 181 recognizes that the destination MAC M7 of the packet 1820 is local to its host machine 181. The LB 171 of the host machine 181 therefore accepts the packet 1820 for bridging. The LB 171 determined that M7 is in VXLAN100 and produced a bridged packet 1821 with VNI of VXLAN100, which is then forwarded to the VM 107 by the DVS 161 based on the destination MAC M7.

As mentioned, in some embodiments, one VDRB in the network is configured as a default bridge that is designated to handle all VXLAN addresses not handled by the LBs in the network. In some embodiments, the default bridge creates an exclude table listing the MAC addresses that it will not bridge. The default bridge in some embodiments populates the exclude table by learning the VXLAN MAC addresses that are already handled by the LBs.

Figure 19A:
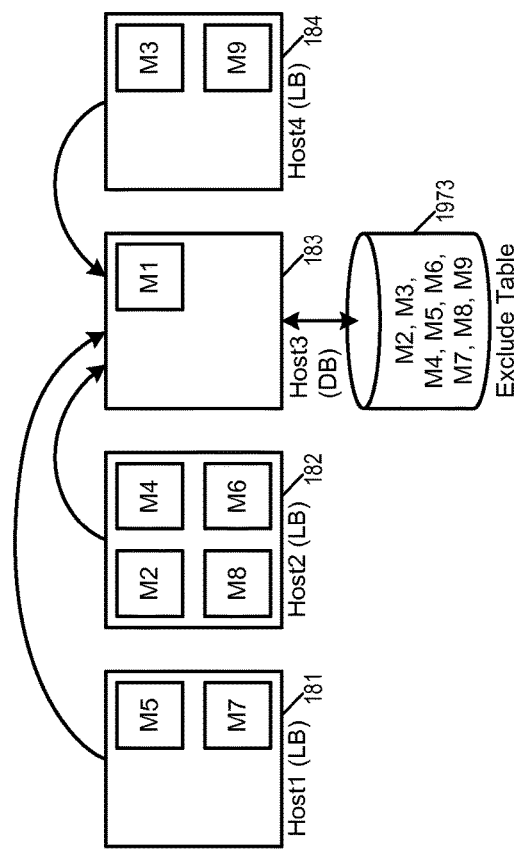
FIG. 19a conceptually illustrates the construction of an exclude table for a default bridge.

FIG. 19a conceptually illustrates the construction of an exclude table for a default bridge. Specifically, the figure illustrates the construction of an exclude table 1973 for the default bridge 173 in the host machine 183. As illustrated, the content of the exclude table 1973 are collected from host machines with LBs, namely, the host machines 181, 182, and 184. The MAC address of VXLAN VMs in those host machines are reported to and collected by the host machine 183 into the exclude table 1973, which includes M5 and M7 from the host 181, M2, M4, M6, and M8 from the host 182, and M3 and M9 from the host 184. The MAC address M1 is not added to the exclude list since it is a VM that is local to the host machine 183 and the default bridge 173.

In order to prevent a MAC address from being bridged by more than one bridge (e.g., an LB and the default bridge), a LB in some embodiments would bridge a particular MAC address only if it knows that the particular MAC address is already added to the default bridge's exclude table. In some embodiments, an LB determines whether to perform bridging based on an include list. A LB adds a particular local MAC address to its include list only after the default bridge has acknowledge that the particular local MAC address has been added to the default bridge's exclude list.

Figure 19B:
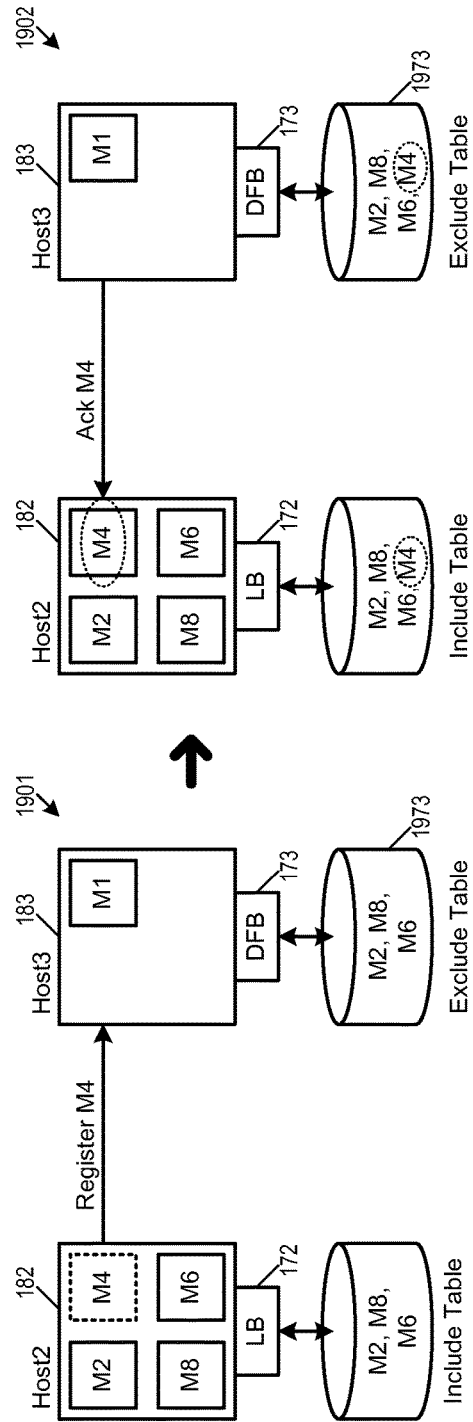
FIG. 19b illustrates an example operation for adding a MAC address to the exclude table of a default bridge.

In two stages 1901-1902, FIG. 19b illustrates an example operation for adding a MAC address to the exclude table 1973 of the default bridge 173.

In a first stage 1901, the host machine 182 (with the LB 172) has already successfully reported MAC addresses M2, M6, and M8 to the host machine 183 (hosting the default bridge 173) and started perform bridging based on these MAC addresses. The host machine 182 is also reporting the MAC address M4 to the host machine 183. However, until the host machine 183 has acknowledged that M4 has been successfully registered in its exclude table 1973, the LB 172 in the host machine 182 will not perform bridging based on M4.

At the second stage 1902, the host machine 183 acknowledged to the host machine 182 that it has added M4 to the exclude table. Based on this acknowledgement, the LB 172 of the host machine 182 would start perform bridging operations based on the M4, along with M2, M6, and M8.

In some embodiments, A VDB controller synchronizes the MAC addresses learned on local bridge to default bridge. The controller also handles the movement of the MAC addresses to new host when supporting virtual machine migration such as vMotion®. In some embodiments, the reporting and the acknowledgement of addition to the exclude table of the default bridge is by control plane messages over the network between the host machines. In some embodiments, the controller does not collect MAC addresses from host machines with LBs and leave the process to be conducted among the host machines themselves.

Figure 20A:
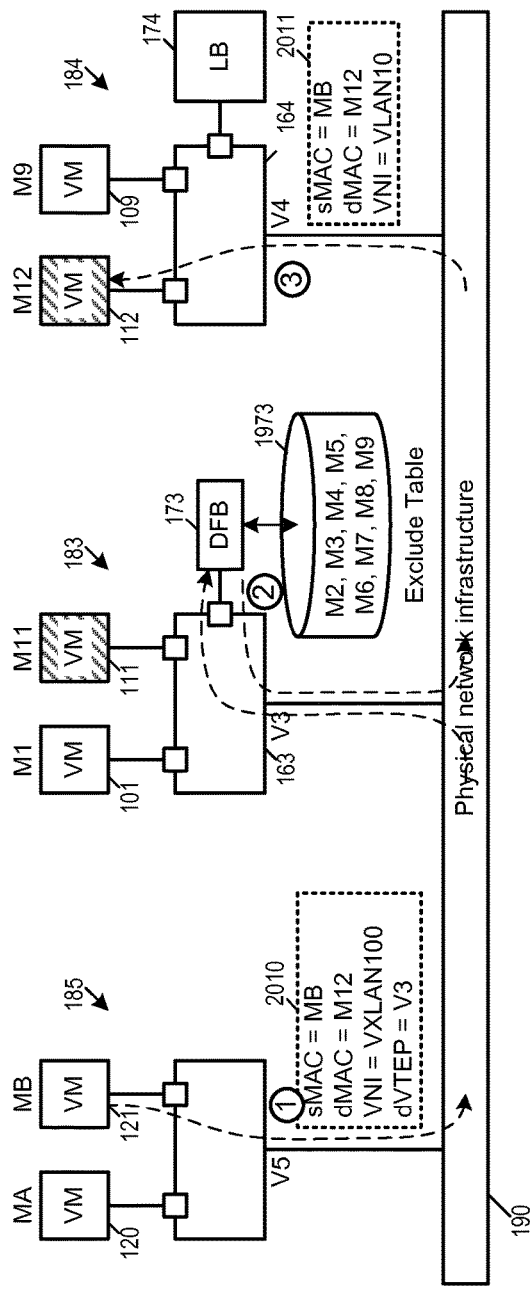
FIGS. 20a-b illustrate the bridging of packets by a default bridge in a network that implements local bridging using LBs.
Figure 20B:
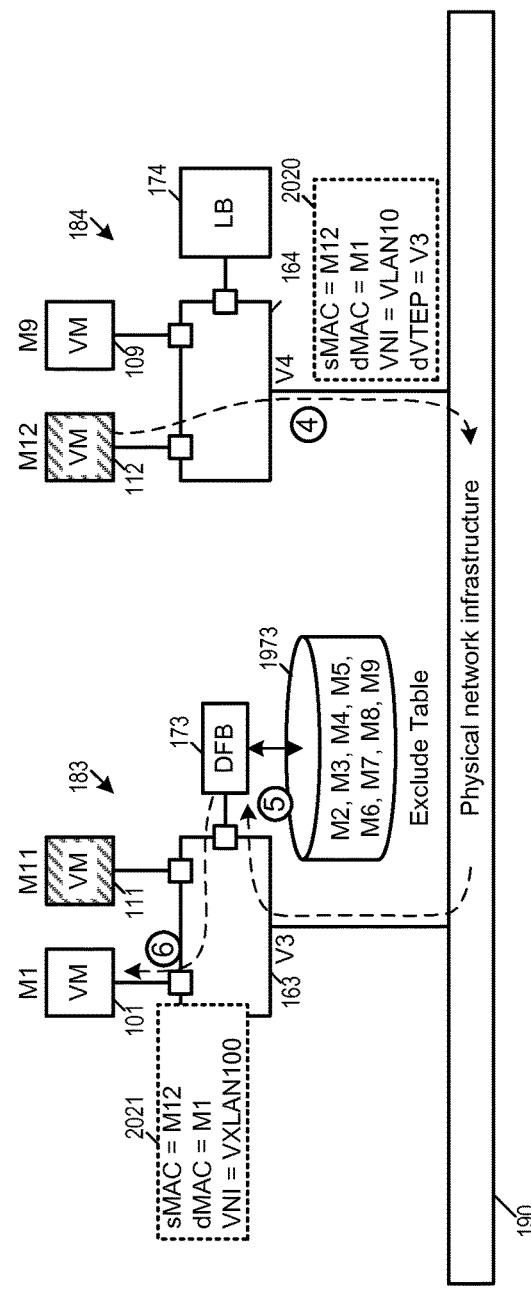

FIGS. 20a-b illustrate the bridging of packets by the default bridge in the network 1700 that implements local bridging using LBs. FIG. 20a illustrates the bridging of a packet 2010 from a VM 121 (MAC address MB) in VXLAN100 to the VM 112 in VLAN10 (MAC address M12). The VM 121 is hosted by a host machine 185 that does not operate a LB. FIG. 20b illustrates the bridging of a packet 1920 from the VM 112 to the VM 101 (MAC address M1) in VXLAN100. These packets are bridged by the default bridge 173 as the MAC addresses of those packets are not in the exclude table 1973 of the default bridge 173.

FIG. 20a illustrates the bridging of the packet 2010 in three operations labeled '1', '2', and '3'. At the first operation labeled '1', the VM 121 (MB) of the host machine 185 produces the packet 2010 destined for M12 with VNI of VXLAN100. Since the destination MAC M12 is not in VXLAN100, the packet 2010 has to be bridged. Since the host machine 185 does not operate a LB, the VXLAN packet 2010 is tunneled to the host machine 183 to be bridged by the default bridge 173.

At the second operation labeled '2', the tunneled packet 2010 reached the host machine 183. Since the VXLAN address "MB" of the packet 2010 is not in the exclude table 1973, the packet is accepted for bridging by the default bridge 173. The default bridge 173 looks up the VNI for the destination address M12 and produces a bridged packet 2011 with VNI for VLAN10.

At the third operation labeled '3', the bridged packet 2011 is injected into the physical network infrastructure 190 and reaches the VM 112 in the host machine 184 based on destination MAC M12 and VNI VLAN10.

FIG. 20b illustrates the bridging of the packet 2020 in three operations labeled '4', '5', and '6'. At the first operation labeled '4', the VM 112 (M12) of the host machine 184 produces the packet 2020 destined for MAC address M1 with VNI of VLAN10. The VLAN packet 2020 is thus injected into the physical network infrastructure 190. However, since the destination MAC M1 is not in VLAN10, the packet 2020 will be bridged.

At the second operation labeled '5', the default bridge 173 of the host machine 183 accepts the packet 2020 for bridging, since its destination MAC M1 is not in its exclude table 1973. The MAC address M1 is local to the host machine 183 (which operates the default bridge 173) and is therefore not added to the exclude table 1973. The default bridge 173 then determines that the VNI of the destination MAC M1 is VXLAN100 and produces a bridged packet 2021.

At the third operation labeled '6', the DVS 163 of the host machine 183 forwards the bridged packet 2021 to the VM 101 based on the VNI and the destination MAC (M1) of the packet. The bridged packet 2021 is forwarded locally within the host machine 183 since the VM 101 is local to the host machine 183.

Figure 21:
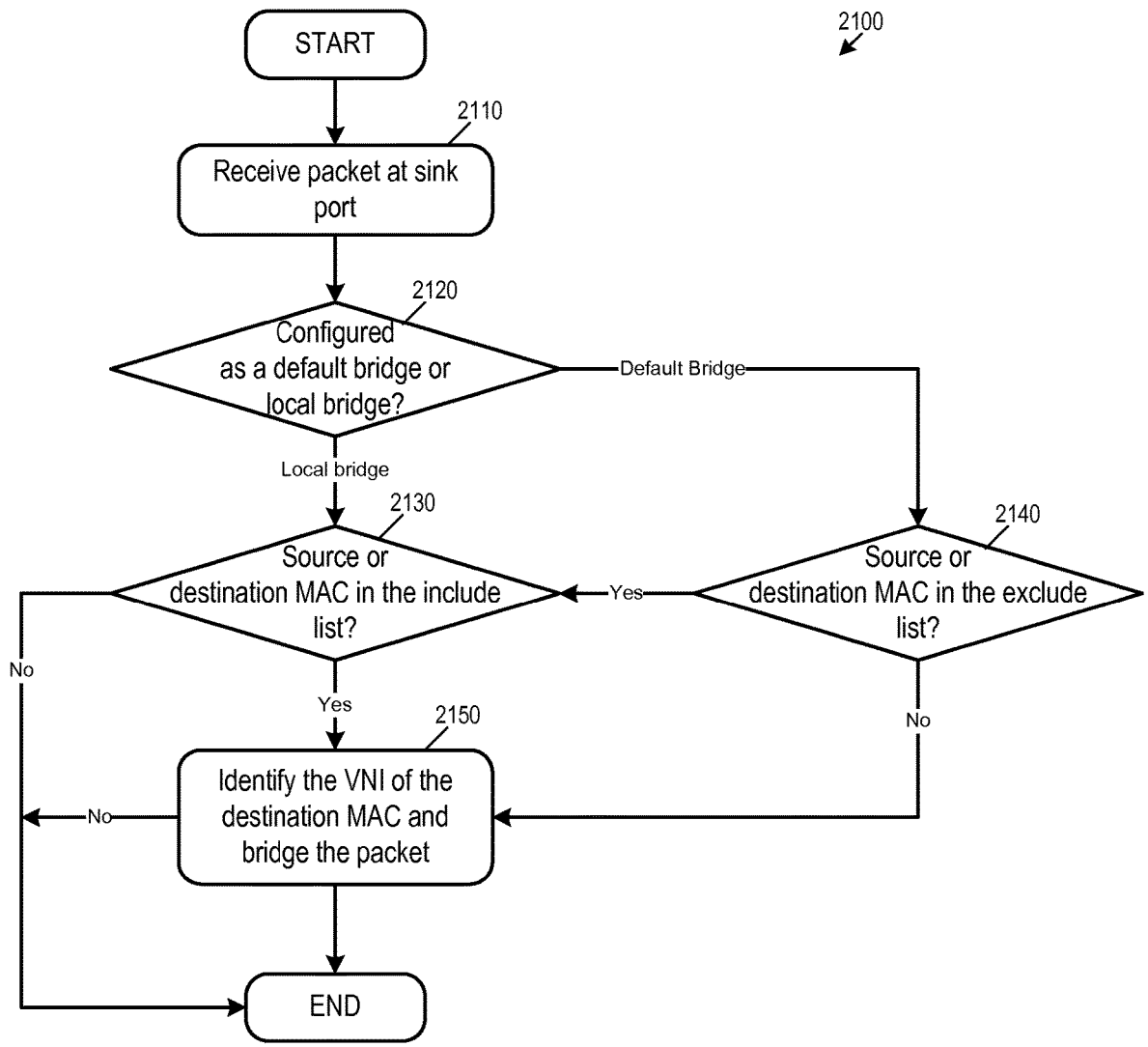
FIG. 21 conceptually illustrates a process for bridging packets in a network that uses local bridging.

FIG. 21 conceptually illustrates a process 2100 for bridging packets in a network that uses local bridging. In some embodiments, the process is performed by the VDRB module of a host machine's virtualization software. The process 2100 starts when it receives (at 2110) a packet at the sink port of the host machine, i.e., the packet is such one that its VNI and destination MAC address do not match any port of the DVS in the host machine. This packet may come from one of VMs local to the host machine, or it may come from the physical network infrastructure.

Next, the process determines (at 2120) whether the VDRB is configured as a local bridge or as a default bridge. If the VDRB is configured as a local bridge, the process proceeds to 2130. If the VDRB is configured as a default bridge, the process proceeds to 2140.

At 2130, the process determines if the source or destination MAC address is in the include list. In some embodiments, since the process at this point has determined the VDRB to be a local bridge, the include list would include MAC addresses of local VMs that are in VXLAN, provided that the LB knows that the MAC address is already in the exclude table of the default bridge. If the source or destination MAC address is in the include list, the process proceeds to 2150. Otherwise, the process 2100 ends without bridging the packet.

At 2140, the process determines if the source or destination MAC address is in the exclude list. In some embodiments, since the process at this point has determined the VDRB to be a default bridge, the exclude list would have the VXLAN MAC addresses of VMs that are local to the LBs. If the source and destination MAC addresses are not in the exclude list, the process proceeds to 2150. If the source or destination MAC address is in the exclude list, the process 2100 proceeds to 2130 to see if VDRB should behave as a local bridge for the excluded MAC address. This is for some embodiments in which a VDRB, even when chosen as a default bridge, would still act as the local bridge for its local MAC addresses. For some embodiments in which a VDRB cannot simultaneously serve as default bridge and local bridge, the process 2100 would end if the source or the destination MAC address is in the exclude list.

At 2150, the process identifies the VNI of the destination MAC and bridges the packet by sending out a bridged packet with the identified VNI. The process 2100 then ends.

Figure 22:
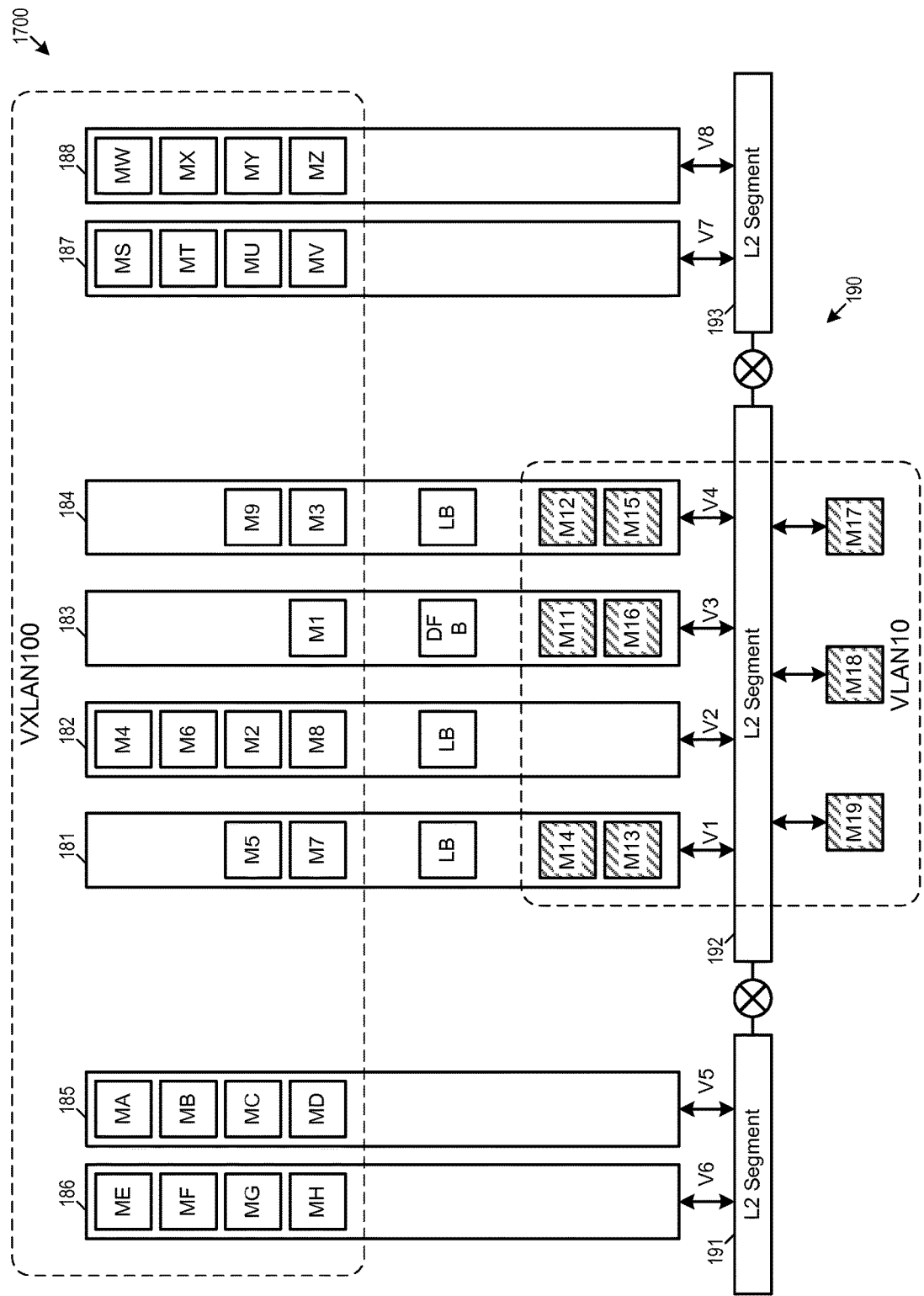
FIG. 22 illustrates a network in which LBs are deployed in one cluster of host machines in which VXLAN and VLAN workloads reside on the same L2 segment.

As mentioned in Section II above, the physical network infrastructure in some embodiments includes multiple clusters of host machines, each cluster of host machines implemented over a L2 segment in the physical network infrastructure. In some of these embodiments, LBs are primarily deployed in one cluster of the physical network infrastructure in which VXLAN and VLAN workload reside on the same physical L2 segment. FIG. 22 illustrates a network in which LBs are deployed in one cluster of host machines in which VXLAN and VLAN workloads reside on the same L2 segment.

FIG. 22 illustrates a more detail view of the network 1700, which is implemented over the physical network 190 that includes the L2 segments 191-193. Each L2 segment interconnecting (and therefore defining) one cluster of host machines. Specifically, the cluster that corresponds to the L2 segment 191 includes host machines 185-186, the cluster that corresponds to the L2 segment 192 includes the host machines 181-184, the cluster that corresponds to the L2 segment 193 includes the host machines 187-188.

As illustrated, VXLAN100 is an overlay logical network spans over host machines 181-188 that are distributed over L2 segments 191-193, while VLAN10 is a physical network segment that is defined by the L2 segment 192, which includes only the host machines 181-184. In other words, VXLAN100 and VLAN10 shares one L2 segment 192 and the cluster of host machine 181-184. Within this cluster (defined by L2 segment 192), VMs and PHs of VXLAN100 and VLAN10 share the same IP subnet, and packets can be bridged between VLAN10 and VXLAN100.

In some embodiments, LBs for bridging between a particular VXLAN and a particular VLAN (e.g., VXLAN100 and VLAN10) are instantiated only in an L2 segment or cluster that is shared by both the VXLAN and the VLAN. In the network 1700, only the VDRBs of the host machines in the L2 segment 192 (i.e., host machines 181-184) are configured as LBs or as the default bridge. VDRBs in other host machines of other clusters are not configured as LBs between the VXLAN and the VLAN. For packets from those other clusters to be bridged, the host machine would have to tunnel the packet to the default bridge in the host machine 183. For some embodiments, configuring the VDRBs in the network as LBs and default bridge in only one cluster of the network is an optimization for when the shared cluster (e.g., the cluster 192 shared by VXLAN100 and VLAN10) is a service cluster for providing communications access to Internet and the outside worlds (which is through VLAN), while other clusters are compute clusters for performing computation tasks and therefore rarely need to send packets to be bridged into VLAN.

IV. Computing Device

Figure 23:
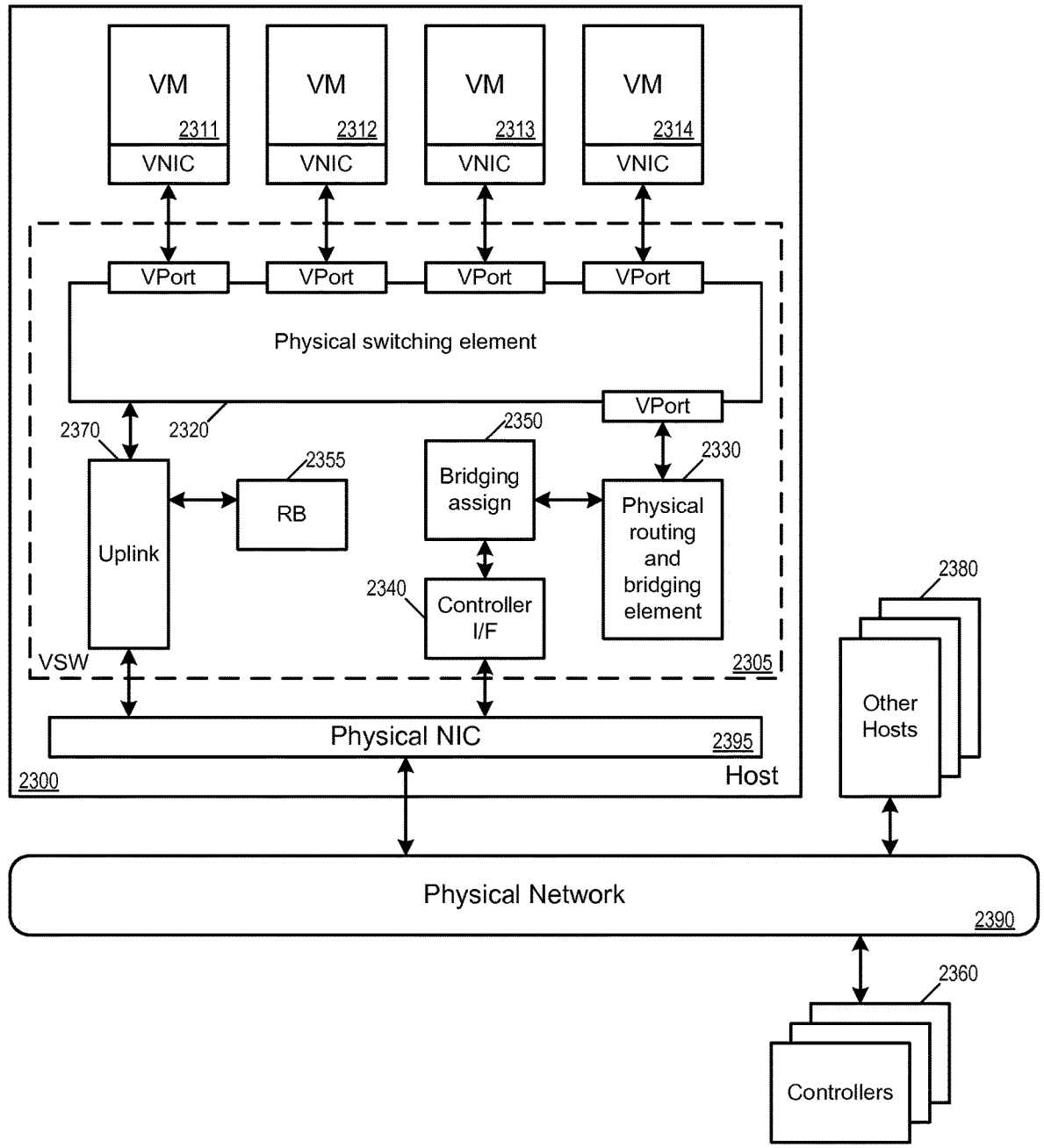
FIG. 23 illustrates an example host machine that is operating virtualization software.

As mentioned earlier, some embodiments of the invention are implemented by virtualization software or hypervisors running on computing devices serving as host machines. For some embodiments, FIG. 23 illustrates an example host machine 2300 that is operating virtualization software 2305. The virtualization software 2305 allows the host machine to host virtual machines 2311-2314 as well as connecting the virtual machines to a physical network 2390. This physical network 2390 may span one or more data centers and include various physical switches and routers.

As illustrated, the host machine 2300 has access to the physical network 2390 through a physical NIC (PNIC) 2395. The virtualization software 2305 serves as the interface between the hosted VMs 2311-2314 and the physical NIC 2395 (as well as other physical resources, such as processors and memory). Each of the VMs includes a virtual NIC (VNIC) for accessing the network through the virtualization software 2305. Each VNIC in a VM is responsible for exchanging packets between the VM and the virtualization software 2305. In some embodiments, the VNICs are software abstractions of physical NICs implemented by virtual NIC emulators.

The virtualization software 2305 manages the operations of the VMs 2311-2314, and includes several components for managing the access of the VMs to the physical network (by implementing the logical networks to which the VMs connect, in some embodiments). As illustrated, the virtualization software 2305 includes a physical switching element 2320, a physical routing element 2330, a controller interface 2340, an uplink module 2370, a bridging assignment storage 2350, and a remote bridging module 2355.

The controller interface 2340 receives control plane messages from a controller or a cluster of controllers 2360. In some embodiments, these control plane message includes configuration data for configuring the various components of the virtualization software and/or the virtual machines (such as the physical switching element 2320 and the physical routing element 2330). In some embodiments, the control plane messages also include information on which MAC addresses should be included or excluded for purpose of bridging by the computing device 2300.

The physical switching element 2320 (or managed physical switching element, MPSE) delivers network data to and from the physical NIC 2395, which interfaces the physical network 2390. The physical switching element also includes a number of virtual ports (vPorts) that communicatively interconnects the physical NIC with the VMs 2311-2314, the physical routing element 2330 and the controller interface 2340. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 2390 (e.g., another VM running on another host). In some embodiments, a physical switching element is referred to as virtual switching element since it is the virtual switch (or vSwitch) in the virtualization software or hypervisor.

The physical routing element 2330 performs L3 routing (e.g., by performing L3 IP address to L2 MAC address resolution) on data packets received from a virtual port on the physical switching element 2320. In some embodiments, the virtual port that the physical routing element 2330 is attached to is a sink port. Each routed data packet is then sent back to the physical switching element 2320 to be forwarded to its destination according to the resolved L2 MAC address. This destination can be another VM connected to a virtual port on the physical switching element 2320, or a reachable L2 network element on the physical network 2390 (e.g., another VM running on another host, a physical non-virtualized machine, etc.).

In some embodiments, the physical routing element 2330 is a physical routing and bridging element (virtual distributed router/bridge or VDBR) that also performs bridging operations. In some embodiments, the physical routing and bridging element 2330 can be configured as a default bridge, a designated bridge (DB), or a local bridge (LB). In some of these embodiments, the physical routing and bridging element 2330 uses the MAC addresses listed in the bridging assignment module 2350 to decide whether to include or exclude a packet for bridging. The operations of the physical routing and bridging element 2330 (or VDRB) as DB is described in Sections I and II above. The operations of the physical routing and bridging element 2330 as LB or default bridge is described in Section III above The bridging assignment module 2350 stores lists of MAC addresses that are to be included or excluded for bridging by the physical routing and bridging element 2330. In some embodiments, the bridging assignment modules 2350 stores the shard of MAC addresses that the physical routing and bridging element 2330 (when configured as a DB) uses as an include table to determine for which VXLAN addresses should bridging be performed. In some embodiments, the bridging assignment module stores a list of VXLAN MAC addresses that corresponds to the VMs operating in the computing device 2300 so the physical routing and bridging element 2330 (when configured as a LB) uses as an include table to determine for which VXLAN addresses should bridging be performed. In some embodiments, the bridging assignment module stores a list of VXLAN MAC addresses that should be excluded from bridging by the physical routing and bridging element 2330 (when configured as a default bridge).

The remote bridging module 2355 (RB) is for identifying or locating a DB that is assigned to perform bridging on an outgoing packet. In some embodiments, the RB module 2355 learns that a particular MAC address is assigned to a particular DB when that particular DB sends a bridged packet to the computing device. Section II above describes the operations of the RB module in further detail.

The uplink module 2370 relays data between the physical switching element 2320 and the physical NIC 2395. In some embodiments, the uplink module 2370 allows the host machine 2300 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 2300 sends a data packet (e.g., an ethernet frame) to another VM in the same VXLAN network but on a different host, the uplink module 2370 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 2370 also decapsulates incoming VXLAN packets and forwards only the original inner data packet to the destination VM.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
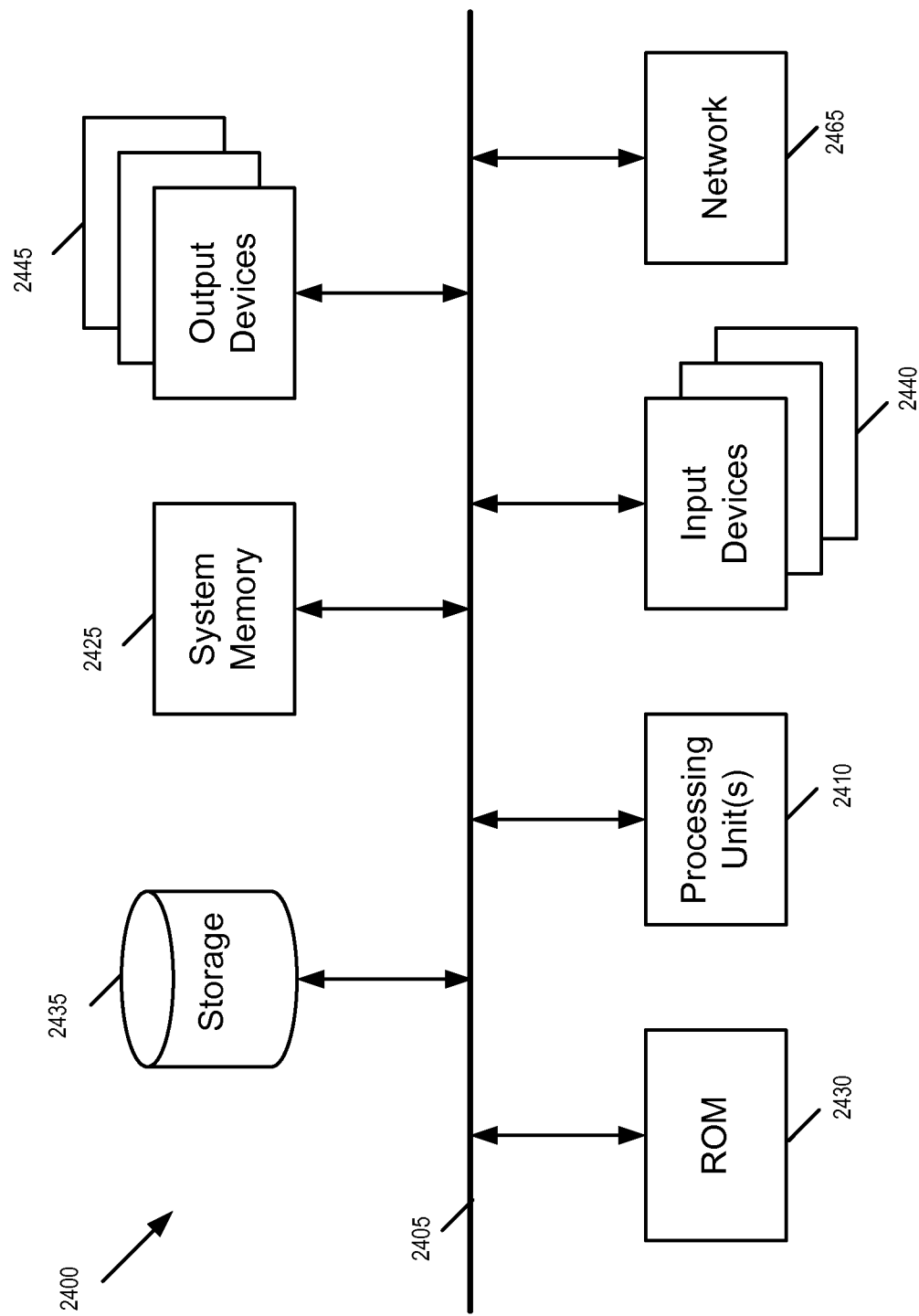
FIG. 24 conceptually illustrates an electronic system with which some embodiments of the invention are implemented.

FIG. 24 conceptually illustrates an electronic system 2400 with which some embodiments of the invention are implemented. The electronic system 2400 can be used to execute any of the control, virtualization, or operating system applications described above. The electronic system 2400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2400 includes a bus 2405, processing unit(s) 2410, a system memory 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the system memory 2425, and the permanent storage device 2435.

From these various memory units, the processing unit(s) 2410 retrieves instructions to execute and data to process in order to execute the processes of the invention. The processing unit(s) may be a single processor or a multi-core processor in different embodiments.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2425 is a read-and-write memory device. However, unlike storage device 2435, the system memory is a volatile read-and-write memory, such a random access memory. The system memory stores some of the instructions and data that the processor needs at runtime. In some embodiments, the invention's processes are stored in the system memory 2425, the permanent storage device 2435, and/or the read-only memory 2430. From these various memory units, the processing unit(s) 2410 retrieves instructions to execute and data to process in order to execute the processes of some embodiments.

The bus 2405 also connects to the input and output devices 2440 and 2445. The input devices enable the user to communicate information and select commands to the electronic system. The input devices 2440 include alphanumeric keyboards and pointing devices (also called "cursor control devices"). The output devices 2445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 24, bus 2405 also couples electronic system 2400 to a network 2465 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 8, 10, 13, 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of forwarding packets associated with an overlay logical network, the method comprising:
   at a first computer:
      receiving, from a second computer through a first tunnel endpoint, a bridged first packet comprising a first MAC (media access control) address belonging to an overlay network as destination address and corresponding to a first data compute node (DCN) executing on the first computer;
      receiving, from a third computer through a second tunnel endpoint, a bridged second packet comprising a second MAC address belonging to the overlay network as destination address and corresponding to a second data compute node (DCN) executing on the first computer;
      transmitting a third packet to the first tunnel endpoint when the third packet requires bridging and has the first MAC address as source address; and
      transmitting a fourth packet to the second tunnel endpoint when the fourth packet requires bridging and has the second MAC address as source address,
   wherein the first computer is not configured to bridge packets sent to and from the first and second MAC addresses.

2. The method of claim 1 further comprising identifying the first packet as a bridged packet when a source MAC address of the first packet does not belong to the overlay logical network.

3. The method of claim 1 further comprising identifying the first packet as a bridged packet when the first packet comprises a flag bit indicating that the first packet has been bridged.

4. The method of claim 1 further comprising recording a source MAC address of the first packet and a source MAC address of the second packet as MAC addresses that require bridging.

5. The method of claim 4 further comprising determining that a transmitted packet requires bridging when its destination MAC address is a MAC address that is recorded as requiring bridging.

6. The method of claim 1, wherein the first and the second tunnel endpoints are for bridging packets from the overlay logical network to a L2 network.

7. The method of claim 6, wherein the overlay logical network is VXLAN.

8. The method of claim 6, wherein the overlay logical network and the L2 network coexists on a same physical L2 segment of a network.

9. The method of claim 1, wherein the computing device is operating a virtualization software for hosting a plurality of virtual machines (VMs), wherein the first MAC address is for a first VM and the second MAC address is for a second VM.

10. The method of claim 1, wherein said receiving and transmitting operations are performed by a first managed forwarding element executing on the first host computer, said bridged first packet is received from a second managed forwarding element executing on the second host computer, said bridged second packet is received from a third managed forwarding element executing on the third host computer, said first, second and third managed forwarding elements implementing a logical forwarding element of the logical overlay network.

11. A non-transitory machine readable medium storing a program, which when executed by at least one processing unit, forwards packets associated with an overlay logical network, the program comprising sets of instructions for:
at a first computer:
receiving, from a second computer through a first tunnel endpoint, a bridged first packet comprising a first MAC (media access control) address belonging to an overlay network as destination address and corresponding to a first data compute node (DCN) executing on the first computer;
receiving, from a third computer through a second tunnel endpoint, a bridged second packet comprising a second MAC address belonging to the overlay network as destination address and corresponding to a second data compute node (DCN) executing on the first computer;
transmitting a third packet to the first tunnel endpoint when the third packet requires bridging and has the first MAC address as source address; and
transmitting a fourth packet to the second tunnel endpoint when the fourth packet requires bridging and has the second MAC address as source address,
wherein the first computer is not configured to bridge packets sent to and from the first and second MAC addresses.

12. The non-transitory machine readable medium of claim 11, wherein a first packet is identified as a bridged packet when a source MAC address of the first packet does not belong to the overlay logical network.

13. The non-transitory machine readable medium of claim 11, wherein the first packet is identified as a bridged packet when the first packet comprises a flag bit indicating that the first packet has been bridged.

14. The non-transitory machine readable medium of claim 11, wherein the program further comprises a set of instructions for recording a source MAC address of the first packet and a source MAC address of the second packet as MAC addresses that require bridging.

15. The non-transitory machine readable medium of claim 14, wherein the program further comprises a set of instructions for determining that a transmitted packet requires bridging when its destination MAC address is a MAC address that is recorded as requiring bridging.

16. The non-transitory machine readable medium of claim 11, wherein the first and the second tunnel endpoints are for bridging packets from the overlay logical network to a L2 network.

17. The non-transitory machine readable medium of claim 16, wherein the overlay logical network is VXLAN.

18. The non-transitory machine readable medium of claim 16, wherein the overlay logical network and the L2 network coexists on a same physical L2 segment of a network.

19. The non-transitory machine readable medium of claim 11, wherein the computing device is operating a virtualization software for hosting a plurality of virtual machines (VMs), wherein the first MAC address is for a first VM and the second MAC address is for a second VM.

* * * * *